(12) United States Patent
Rigby

(10) Patent No.: US 8,460,520 B2
(45) Date of Patent: Jun. 11, 2013

(54) ELECTROCHEMICAL SYSTEM AND METHOD FOR THE TREATMENT OF WATER AND WASTEWATER

(76) Inventor: David Rigby, Falls Church, VA (US)

( * ) Notice: Subject to any disclaimer, the term of this patent is extended or adjusted under 35 U.S.C. 154(b) by 864 days.

(21) Appl. No.: 12/492,367

(22) Filed: Jun. 26, 2009

(65) Prior Publication Data

US 2009/0321251 A1 Dec. 31, 2009

Related U.S. Application Data

(60) Provisional application No. 61/075,842, filed on Jun. 26, 2008.

(51) Int. Cl.
*C02F 1/461* (2006.01)

(52) U.S. Cl.
USPC ... 204/229.6; 210/243; 210/153; 210/748.01; 204/278.5; 204/248; 204/270; 204/228.1; 422/22; 422/28; 422/186.04; 422/186.13; 422/186.15; 205/687

(58) Field of Classification Search
USPC ............... 210/600, 649, 650, 651, 634, 660, 210/681, 767, 260, 295, 296, 323.1, 323.2; 204/228.1–229.6, 248, 270; 422/22, 28, 186, 422/186.04, 186.13, 186.15; 205/687
See application file for complete search history.

(56) References Cited

U.S. PATENT DOCUMENTS

| | | | | |
|---|---|---|---|---|
| 4,872,959 A * | 10/1989 | Herbst et al. | .................. | 205/566 |
| 5,034,110 A * | 7/1991 | Glore et al. | ................ | 204/229.5 |
| 5,271,814 A * | 12/1993 | Metzler | .......................... | 205/743 |
| 5,364,512 A * | 11/1994 | Earl | .............................. | 210/138 |
| 6,309,532 B1 * | 10/2001 | Tran et al. | ..................... | 205/687 |
| 6,663,783 B2 | 12/2003 | Stephenson et al. | | |
| 6,800,206 B2 | 10/2004 | Robinson et al. | | |
| 6,860,990 B2 * | 3/2005 | Bartl et al. | ..................... | 210/143 |
| 6,866,757 B2 | 3/2005 | Gilmore | | |
| 6,960,301 B2 | 11/2005 | Bradley | | |
| 8,226,813 B2 * | 7/2012 | Nakano | ......................... | 205/742 |
| 2002/0043462 A1 * | 4/2002 | Ivory et al. | ..................... | 204/450 |
| 2003/0106854 A1 * | 6/2003 | Robinson | ...................... | 210/748 |
| 2009/0127194 A1 * | 5/2009 | Joo | ................. | 210/638 |

FOREIGN PATENT DOCUMENTS

WO WO 2008026462 A1 * 3/2008

OTHER PUBLICATIONS

Abu-Orf, M. et al., "Electric Avenue—Pretreating solids with electric arc treatment enhances dewaterability," W, E, and T, Jul. 2000, pp. 64-68.

(Continued)

*Primary Examiner* — Joseph Drodge
*Assistant Examiner* — Cameron J Allen
(74) *Attorney, Agent, or Firm* — Millen, White, Zelano & Branigan P.C.

(57) ABSTRACT

Contaminants are removed from raw water or discharge water from plants, such as sewerage and industrial plants, by applying direct current through an array of spaced, alternately charged electrodes to eliminate or minimize clogging of the electrodes with precipitated contaminants. Polarity may be switched periodically to assist in eliminating or minimizing clogging. In illustrated embodiments, electrode arrays are contained in housings of dielectric material to form modules, To increase processing capacity, the modules are arranged in parallel arrays. Alternatively, a single module is scaled up for large or industrial applications or scaled down for personal use. Instead of housing the electrode arrays in modules through which liquid passes, the electrode arrays for some batch applications are dipped in the water or aqueous solutions.

25 Claims, 12 Drawing Sheets

OTHER PUBLICATIONS

Adhoum, N. et al., "Decolourization and removal of phenolic compounds from olive mill wastewater by electrocoagulation," Chemical Engineering and Processing, 2004, vol. 43, No. 10, pp. 1281-1287, Abstract.

Andreev, S. et al., "Upgrading of wastewater treatment facilitates of the Mokshansk dairy plant," Vodosnabzhenie I Sanitarnaya Tekhnika, 1995, vol. 6, pp. 26-27, Abstract.

Andreev, S. et al., "Upgrading of wastewater treatment facilitates of the Mokshansk dairy plant," Vodosnabzhenie I Sanitarnaya Tekhnika, 1995, vol. 6, pp. 26-27.

Bayramoglu, M. et al., "Operating cost analysis of electrocoagulation of textile dye wastewater," Separation and Purification Technology, 2004, vol. 37, No. 2, pp. 117-125, Abstract.

Bayramoglu, M. et al., "Operating cost analysis of electrocoagulation of textile dye wastewater," Separation and Purification Technology, 2004, vol. 37, No. 2, pp. 117-125.

Beck, E. C. et al., "Electroagulation clarifies food wastewater," Food Technology, 1974, vol. 28, No. 2, pp. 18-19, Abstract.

Beck, E. C. et al., "Electroagulation clarifies food wastewater," Food Technology, 1974, vol. 28, No. 2, pp. 18-19.

Bejankiwar, R. S. et al., "Electrochemical treatment of cigarette industry wastewater: feasibility study," Water Research, 2002, vol. 36, No. 17, pp. 4386-4390, Abstract.

Bejankiwar, R. S. et al., "Electrochemical treatment of cigarette industry wastewater: feasibility study," Water Research, 2002, vol. 36, pp. 4386-4390.

Bektas, N. et al., "Removal of phosphate from aqueous solutions by electro-coagulation," Journal of Hazardous Materials, 2004, vol. 106, No. 2-3, pp. 101-105, Abstract.

Bektas, N. et al., "Removal of phosphate from aqueous solutions by electro-coagulation," Journal of Hazardous Materials, 2004, vol. 106, No. 2-3, pp. 101-105.

Belov, L. P. et al., "Electroagulation treatment of wastewater of hydrolysis-yeast production," Khim. Pererab. Drev., 1983, pp. 56-60, Abstract.

Belov, L. P. et al., "Possible Improvement of an electrocoagulator," Khim. Pererab. Drev. Syr'ya, 1984, pp. 45-49, Abstract.

Belov, L. P. et al., "Possible Improvement of an electrocoagulator," Khim. Pererab. Drev. Syr'ya, 1984, pp. 45-49.

Bilyk, A., "Electrocoagulation of biologically treated wastewater," Mater. Miedzynar. Konf. Nauk, 1978, vol. 1, pp. 235-255, Abstract.

Bilyk, A., "Electrocoagulation of biologically treated wastewater," Mater. Miedzynar. Konf. Nauk, 1978, vol. 1, pp. 235-255.

Biwyk, A. et al., "Electrocoagulation of biologically treated sewage," Proceedings of the Industrial Waste Conference, 1981, vol. 35, pp. 541-549, Abstract.

Biwyk, A. et al., "Electrocoagulation of biologically treated sewage," Proceedings of the Industrial Waste Conference, 1981, vol. 35, pp. 541-549.

Buso, A. et al., "Electrochemical removal of tannins from aqueous solutions," Industrial and Engineering Chemistry Research, 2000, vol. 39, No. 2, pp. 494-499, Abstract.

Buso, A. et al., "Electrochemical removal of tannins from aqueous solutions," Industrial and Engineering Chemistry Research, 2000, vol. 39, No. 2, pp. 494-499.

Bustamante, H. A. et al., "Innovative techniques for the handling and reuse of water treatment plant sludges," Water Supply, 1995, vol. 13, pp. 233-238, Abstract.

Bustamante, H. A. et al., "Innovative techniques for the handling and reuse of water treatment plant sludges," Water Supply, 1995, vol. 13, pp. 233-238.

Carstadt, U. et al., "Conditioning of sewage sludge by electrocoagulation," ATV-Schriftenreihe, 1999, Abstract.

Chen, G. et al., "Electrocoagulation and electroflotation of restaurant wastewater," Journal of Environmental Engineering, 2000, vol. 126, No. 9, pp. 858-863, Abstract.

Chen, G. et al., "Electrocoagulation and electroflotation of restaurant wastewater," Journal of Environmental Engineering, 2000, vol. 126, No. 9, pp. 858-863.

Chen, X. et al., "Analysis of electrocoagulation energy consumption and measures of enegery saving," Shuichuli Jishu, 1997, vol. 23, No. 3, pp. 165-168, Abstract.

Chen, X. et al., "Investigation on the electrolysis voltage of electrocoagulation," Chemical Engineering Science, 2002, vol. 57, No. 13, pp. 2449-2455, Abstract.

Chowwanapoonpohn, S. et al., "Electrocoagulation of certain organic substance," ACGC Chemical Research Communications, 2002, vol. 14, pp. 70-75, Abstract.

Chowwanapoonpohn, S. et al., "Electrocoagulation of certain organic substance," ACGC Chemical Research Communications, 2002, vol. 14, pp. 70-75.

Ciorba, G. A. et al., "Correlation between organic component and electrode material: consequences on removal of surfactants from wastewater," Electrochimica Acta, 2000, vol. 46, pp. 297-303.

Daily, J. et al., "Alternatives matrix," Technical Memorandum No. 2, Jan. 5, 2007.

Daily, J. et al., "Wastewater characterization, treatment objectives and existing system assets," Technical Memorandum No. 1, Dec. 21, 2006.

Dalrymple, C. W. et al., "Electrocoagulation of Industrial wastewaters," Proceedings Annual Meeting—Air & Watse Management Association, 1997, Abstract.

Dalrymple, C. W. et al., "Electrocoagulation of Industrial wastewaters," Proceedings Annual Meeting—Air & Watse Management Association, 1997.

Donini, J. C. et al., "Electrocoagulation," Emerging Sep. Technol. Met. Fuels, Proc. Symp., 1993, pp. 409-424, Abstract.

Donini, J. C. et al., "Electrocoagulation," Emerging Sep. Technol. Met. Fuels, Proc. Symp., 1993, pp. 409-424.

Donini, J. C. et al., "The operating cost of electrocoagulation," Canadian Journal of Chemical Engineering, 1994, vol. 72, No. 6, pp. 1007-1012, Abstract.

Donini, J. C. et al., "The operating cost of electrocoagulation," Canadian Journal of Chemical Engineering, 1994, vol. 72, No. 6, pp. 1007-1012.

Farrell, J. M., "Electrochemical methods for wastewater and potable water treatment," 2002, vol. 42, No. 2, pp. 501-507, Abstract.

Feng, C. et al., "Performance of Two New Electrochemical Treatment Systems for Wastewaters," Journal of Environmental Science and Health, 2004, Abstract.

Feng, C. et al., "Performance of Two New Electrochemical Treatment Systems for Wastewaters," Journal of Environmental Science and Health, 2004.

Feng, S. et al., "Electro-coagulation process for phosphorus removal from secondary effluent," Zhongguo Jishul Paishui, 2003, vol. 19, No. 1, pp. 52-54, Abstract.

Ganin, B. A. et al., "Study of methods of treating run-off water from thickeners of fermented sludge," Trudy-Mosvodkokanalniiproekt, 1977, vol. 1, pp. 63-73, Abstract.

Gega, J. et al., "Radical clarifiers and thickeners with lamella modules," Environmental Science Research, 1991, vol. 42, pp. 465-473, Abstract.

Gega, J. et al., "Radical clarifiers and thickeners with lamella modules," Environmental Science Research, 1991, vol. 42, pp. 465-473.

Grechko, A. V. et al., "Removal of pesticides from greenhouse drainage wastewater," Khimiya I Tekhnologiya Vody, 1982, vol. 4, No. 1, pp. 56-58, Abstract.

Grechko, A. V. et al., "Removal of pesticides from greenhouse drainage wastewater," Khimiya I Tekhnologiya Vody, 1982, vol. 4, No. 1, pp. 56-58.

Greene, H. W., "Waste Water Treatment by Electric Arc," Scientific Utilization Inc., Aug. 10, 1994.

Groeterud, O. et al., "Phosphorus removal from water by means of electrolysis," Water Research, 1986, vol. 20, No. 5, pp. 667-669, Abstract.

Groeterud, O. et al., "Phosphorus removal from water by means of electrolysis," Water Research, 1986, vol. 20, No. 5, pp. 667-669.

Haba, A. et al., "Research on a possibility of using electroflotation process for waste treatment from fish proceedings," Environment Protection Engineering, 1994, vol. 18, No. 3-4, pp. 19-27, Abstract.

Haba, A. et al., "Research on a possibility of using electroflotation process for waste treatment from fish proceedings," Environment Protection Engineering, 1994, vol. 18, No. 3-4, pp. 19-27.

Ibanez, J. G. et al., "Laboratory Experiments on electrochemical remediation of the environment: electrocoagulation of oily wastewater," Journal of Chemical Education, 1995, vol. 72, No. 11, pp. 1050-1052, Abstract.

Ibanez, J. G. et al., "Laboratory Experiments on electrochemical remediation of the environment: electrocoagulation of oily wastewater," Journal of Chemical Education, 1995, vol. 72, No. 11, pp. 1050-1052.

Inan, H. et al., "Olive oil mill wastewater treatment by means of electro-coagulation," Separation and Purification Technology, 2004, vol. 36, No. 1, pp. 23-31, Abstract.

Inan, H. et al., "Olive oil mill wastewater treatmen by means of electro-coagulation," Separation and Purification Technology, 2004, vol. 36, No. 1, pp. 23-31.

Ionenko, V. I. et al., "Mathematical modeling of electrocoagulation," Gidrotekh. Sooruzhenii Inzh. Gidrogeol. 1973, vol. 40, No. 1, pp. 103-107, Abstract.

Jaouani, A. et al., "Proposal of a treatment flowchart for the olive oil mill wastewaters," Universiteit Gent, 2000, vol. 65, No. 3a, pp. 111-113, Abstract.

Jaouani, A. et al., "Proposal of a treatment flowchart for the olive oil mill wastewaters," Universiteit Gent, 2000, vol. 65, No. 3a, pp. 111-113.

Joffe, L. et al., "Electrocoagulation," Industrial Wastewater, 2000, Abstract.

Joffe, L. et al., "Electrocoagulation," Industrial Wastewater, 2000.

Karpuzcu, M. et al., "Purification of agro-industrial wastewater from the grease-protein mixture by means of electroflotocoagulation," Water Science and Technology, 2002, vol. 45, No. 12, pp. 233-240, Abstract.

Karpuzcu, M. et al., "Purification of agro-industrial wastewater from the grease-protein mixture by means of electroflotocoagulation," Water Science and Technology, 2002, vol. 45, No. 12, pp. 233-240.

Khristoskova, S. et al., "Possibility of purification and decoloring wastewaters from the yeast industry by electrocoagulation," Nauchni Trudove—Plovdivski Universitet Paisil Khilendarski, 1984, Abstract.

Khristova, S. et al., "Study of the possibility of treating and decolorizing yeast production wastewater by electrocoagulation," Tseluloza I Khartiya, 1984, vol. 15, No. 6, pp. 24-25, Abstract.

Khristova, S. et al., "Study of the possibility of treating and decolorizing yeast production wastewater by electrocoagulation," Tseluloza I Khartiya, 1984, vol. 15, No. 6, pp. 24-25.

Kozyura, A. S. et al., "Electrocoagulation of synthetic latex in waste waters," Gidrotekhnicheskie Sooruzheniya, 1974, vol. 17, pp. 81-84, Abstract.

Kozyura, A. S. et al., "Electrocoagulation of synthetic latex in waste waters," Gidrotekhnicheskie Sooruzheniya, 1974, vol. 17, pp. 81-84.

Lai, J. et al., "Study on removing organic matter from swine wastewater by the electrocoagulation method," Huanjing Baohu (Taipei, Taiwan), 1993, vol. 16, No. 1, pp. 18-34, Abstract.

Matveenko, A. P. et al., "Technology of treating wastewater to remove organomineral matter suspended in concentrated aqueous solutions from wastewaters," Zhurnal Prikladnoi khimii, 1985, vol. 58, No. 1, pp. 122-126, Abstract.

Matveenko, A. P. et al., "Technology of treating wastewater to remove organomineral matter suspended in concentrated aqueous solutons from wastewaters," Zhurnal Prikladnoi khimii, 1985, vol. 58, No. 1, pp. 122-126.

Mejbaum, Z. et al., "Removal of emulsified oils from effluents by electrocoagulation," Przemysl Chemiczny, 1978, vol. 57, No. 8, pp. 407-410, Abstract.

Mejbaum, Z. et al., "Removal of emulsified oils from effluents by electrocoagulation," Przemysl Chemiczny, 1978, vol. 57, No. 8, pp. 407-410.

Merkvirt, R. K. et al., "Results of studies on electric treatment of petroleum-containing wastewaters from tankers," 1982, Abstract.

Metzler, D. M. A. et al., "Thin film electrocoagulation for removal for containments from liquid media," Abstract of US-5 271 814, Publication Date: Dec. 21, 1993.

Mills, D. et al., "A new process for electrocoagulation," American Water Works Association, 2000, vol. 92, No. 6, pp. 34-43, Abstract.

Mills, D. et al., "A new process for electrocoagulation," American Water Works Association, 2000, vol. 92, No. 6, pp. 34-43.

Min, K. et al., "Removal of ammonium from tannery wastewater by electrochemical treatment," Journal of Environmental Science and Health, 2004, Abstract.

Min, K. et al., "Removal of ammonium from tannery wastewater by electrochemical treatment," Journal of Environmental Science and Health, 2004.

Mollah, M. Y. A. et al., "Electrocoagulation (EC)—Science and applications," Journal of Hazardous Materials, 2001, vol. 84, No. 1, pp. 29-41, Abstract.

Mollah, M. Y. A. et al., "Electrocoagulation (EC)—Science and applications," Journal of Hazardous Materials, 2001, vol. 84, No. 1, pp. 29-41.

Nanescu, V. et al., "Water cleaning and treating by electrocoagulation," Industria Usoara, 1984, vol. 31, No. 8, pp. 348-351, Abstract.

Parekh, B. K. et al., "The alternating current electro-coagulation process," Advances in Filtration and Separation Technology, 1990, pp. 548-554, Abstract.

Parekh, B. K. et al., "The alternating current electro-coagulation process," Advances in Filtration and Separation Technology, 1990, pp. 548-554.

Paul, A. B. et al., "Electrolytic treatment of turbid water in package plant," Reaching the Unreached: Challenges for the $21^{st}$ Century, 1996, pp. 286-288.

Peters, R. W. et al., "Wastewater treatment—physical and chemical methods," Journal—Water Pollution Control Federation, 1986, vol. 58, No. 6, pp. 481-490, Abstract.

Peters, R. W. et al., "Wastewater treatment—physical and chemical methods," Journal—Water Pollution Control Federation, 1986, vol. 58, No. 6, pp. 481-490.

Piatrik, M. et al., "Pretreatment of wastewater from production of starch by electroflotation," Vodni Hospodarstvi, 1991, vol. 41, No. 9, pp. 328-330, Abstract.

Pikaev, A. K. et al., "Combined electron-beam and coagulation purificiation of molasses distillery slops. Features of the method, technical, and economic evaluation of large-scale facility," Radiation Physics and Chemistry, 2001, vol. 61, No. 1, pp. 81-87, Abstract.

Pikaev, A. K. et al., "Combined electron-beam and coagulation purification of molasses distillery slops. Features of the method, technical and economic evaluation of large-scale facility," Radiation Physics and Chemistry, 2001, vol. 61, pp. 81-87.

Pillay, G. et al., "Electrochemical treatment and minimization of defense-related wastes," Proceedings—Electrochemical Society, 2000, Abstract.

Pillay, G. et al., "Electrochemical treatment and minimization of defense-related wastes," Proceedings—Electrochemical Society, 2000.

Pogrebnaya, V. L. et al., "Purification of wastewater of food factories containing proteins," Pishchevaya Teknologiya, 1994, Abstract.

Pogrebnaya, V. L. et al., "Purification of wastewater of food factories containing proteins," Pishchevaya Teknologiya, 1994.

Polunina, E. et al., "Electrocoagulation treatment of sewage in antibiotic production," Antibiotiki I Khimioterapiya, 1995, vol. 40, No. 11-12, pp. 10-15, Abstract.

Polunina, E. et al., "Electrocoagulation treatment of sewage in antibiotic production," Antibiotiki I Khimioterapiya, 1995, vol. 40, No. 11-12, pp. 10-15.

Pouet, M. F. et al., "Couplage Electrocoagulation-Flottation: Application comme Pretraitement a la microfiltration tangentielle en traitement des eaux," Recents Progres en Genie des Procedes, 1991, vol. 5, No. 12, pp. 195-200.

Pouet, M. F. et al., "Electrocoagulation-flotation as pretreatment in tangential microfiltration in water treatment," Recents Progres en Genie des Procedes, 1991, vol. 5, No. 12, pp. 195-200, English Abstract.

Pouet, M. F. et al., "Urban wastewater treatment by electrocoagulation and flotation," Water Science and Technology, 1995, vol. 31, No. 3-4, pp. 275-283, Abstract.

Pouet, M. F. et al., "Urban wastewater treatment by electrocoagulation and flotation," Water Science and Technology, 1995, vol. 31, No. 3-4, pp. 275-283.

Renk, R., "Treatment of Hazardous Wastewaters by Electrocoagulation," 1989.

Rogov, V. M. et al., "Use of electrocoagulation-flotation in the technology of water treatment," Elektronnaya Obrabotka Materialov, 1978, vol. 6, pp. 80-83, Abstract.

Rogov, V. M. et al., "Use of electrocoagulation-flotation in the technology of water treatment," Elektronnaya Obrabotka Materialov, 1978, vol. 6, pp. 80-83.

Sakakibara, Y. et al., "Phosphate removal and recovery by a novel electrolytic process," Water Science and Technology, 2002, vol. 46, No. 11-12, pp. 147-152, Abstract.

Sakakibara, Y. et al., "Phosphate removal and recovery by a novel electrolytic process," Water Science and Technology, 2002, vol. 46, No. 11-12, pp. 147-152.

Sims, R. C. et al., "Electrocoagulation Removes Metals from Wastewater," Tech Trends, Sep. 1996.

Solids Recovery From Seafood Processing Stick Water Using Electrocoagulation, Feb. 1996.

Strokatova, S. F. et al., "Removal of protein-fat fractions from concentrated wastewater," Khimicheskaya Promyshlennost, 2000, vol. 11, pp. 581-583, Abstract.

Strokatova, S. F. et al., "Removal of protein-fat fractions from concentrated wastewater," Khimicheskaya Promyshlennost, 2000, vol. 11, pp. 581-583.

Tabakov, D. et al., "Influence of material of electrode system on the effect of treatment of dairy sewage by electrocoagulation and flotation," Woda I Technika Sanitarna, 1982, vol. 56, No. 9-10, pp. 197-198, Abstract.

Tabakov, D. et al., "Influence of material of electrode system on the effect of treatment of dairy sewage by electrocoagulation and flotation," Woda I Technika Sanitarna, 1982, vol. 56, No. 9-10, pp. 197-198.

Tabakov, D. et al., "Purification of dairy industry wastewater," Khranitelna Promishlenost, 1984, vol. 33, No. 7, pp. 22-23, Abstract.

Tabakov, D. et al., "Purification of dairy industry wastewater," Khranitelna Promishlenost, 1984, vol. 33, No. 7, pp. 22-23.

Tabakov, D. et al., "Treatment and utilization of wastewater from the dairy industry," Molochnaya Promyshlennost, 1984, vol. 11, pp. 43-45, Abstract.

Tabakov, D. et al., "Treatment and utilization of wastewater from the dairy industry," Molochnaya Promyshlennost, 1984, vol. 11, pp. 43-45.

Tamarkin, S. et al., "Method and apparatus for industrial wastewater treatment," Abstract of US-5 658 450, Publication Date: Aug. 19, 1997.

Tipton, G. et al., "New Life for an Old Process," Heavy Metals Removal, Environmental Technology, Jan./Feb. 1999, pp. 28-30.

Wang, F. et al., "Treatment of wasterwater from antiseptic agent production," Shanghai Huanjing Kexue, 1990, vol. 9, No. 10, pp. 37-38, Abstract.

Xu, L. J. et al., "Recovery and utilization of useful by-products from egg processing wastewater by electrocoagulation," Poultry Science, 2002, vol. 81, No. 6, pp. 785-792, Abstract.

Xu, L. J. et al., "Recovery and utilization of useful by-products from egg processing wastewater by electrocoagulation," Poultry Science, 2002, vol. 81, No. 6, pp. 785-792.

SciFinder Scholar, Oct. 26, 2004.

Chiou, J. et al., "Study on removing organic matter from swine wastewater by the electrcoagulation method," Journal of the Environmental Protection Society of the Republic of China, Jun. 1993, vol. 16, No. 1.

Alvarado, J. H. et al., "Evaluation of Electrocoagulation Technology for the Removal of Chromium, Silver, Zinc, and Nickel," George Washington University—Civil and Environmental Engineering Department, 2003.

Barkley, N. P. et al., "Emerging Technology Summary—Electro-Pure Alternating Current Electrocoagulation," United States Environmental Protection Agency, Sep. 1993.

Cocke, D. L. et al., "Electrocoagulation an evolving electrochemical technology for wastewater treatment," Preprints of Extended Abstracts presented at the ACS National Meeting, American Chemical Society, Division of Environmental Chemistry, 2002, vol. 42, No. 2, pp. 501-507, Abstract.

Cora-Hernandez et al., "Electrocoagulation/flotation (ECF) technology used in the treatment of wastewater containing variable concentrations of heavy metals and organic pollutants," Diss. Abstr. Int., 2003, vol. 63, No. 12.

Current Water Technology Industrial Wastewater Treatment Equipment, Feb. 25, 2002.

General Environmental Corporation, Cure Electrocoagulation Technology, Innovative Technology Evaluation Report, Sep. 1998.

Gilmore, F. W. et al., "Electrocoagulation—A technical analysis," Oct. 2001.

Louisiana Sugarcane Research, http://www.agctr.lsu.edu/Subjects/sugarcane/clarification.asp, Feb. 25, 2002.

Kaselco by Kaspar, Wastewater Treatment Utilizing Electrocoagulation, http://www.kaselco.com/, Oct. 22, 2003.

Matsumoto, M. R. et al., "Physicochemical Processes," Water Environment Research, 1996, vol. 68, No. 4, pp. 431-460.

New Electrocoagulation process treats emulsified oily wastewater at Vancouver Shipyards, http://www.esemag.com/0103/electro.html, Jan. 2003.

Electrocoagulation: An Innovative Waste-Water Treatment Technology, http://www.parsenviro.com/electro.html, Oct. 22, 2003.

Phutdhawong, W. et al., "Electrocoagulation and subsequent recovery of phenolic compounds," Analytical Sciences, Oct. 2000, vol. 16, pp. 1083-1084.

Powell Water Systems, Inc., "Electrocoagulation and Wastewater Treatment Systems," http://www.powellwater.com, Oct. 22, 2003.

RECRA Environmental, Inc., http://www.clu-in.org/products/site/complete/rcraenvi.htm, Feb. 25, 2002.

Smith, J., Clean Water, Inc., 1993.

Specializing in the Treatment of Industrial Wastewater Using Advanced Non-Chemical Wastewater Treatment Technology, Advanced Scientific Water Systems, Feb. 25, 2002.

The Stormwater Management Electrocoagulation System, 2002.

Vorontsova, L. V. et al., "Removal of fine mineral particles from wastewaters," 2002.

Ionic Electrocoagulation for cleanup of Heavy Metals, Hexavalent Chrome, etc., http://www.wee-engineer.com/ionic.htm, Feb. 25, 2002.

WMRC Factsheet, Electrocoagulation Technology Ace Plating, Part II, Dec. 2001.

* cited by examiner

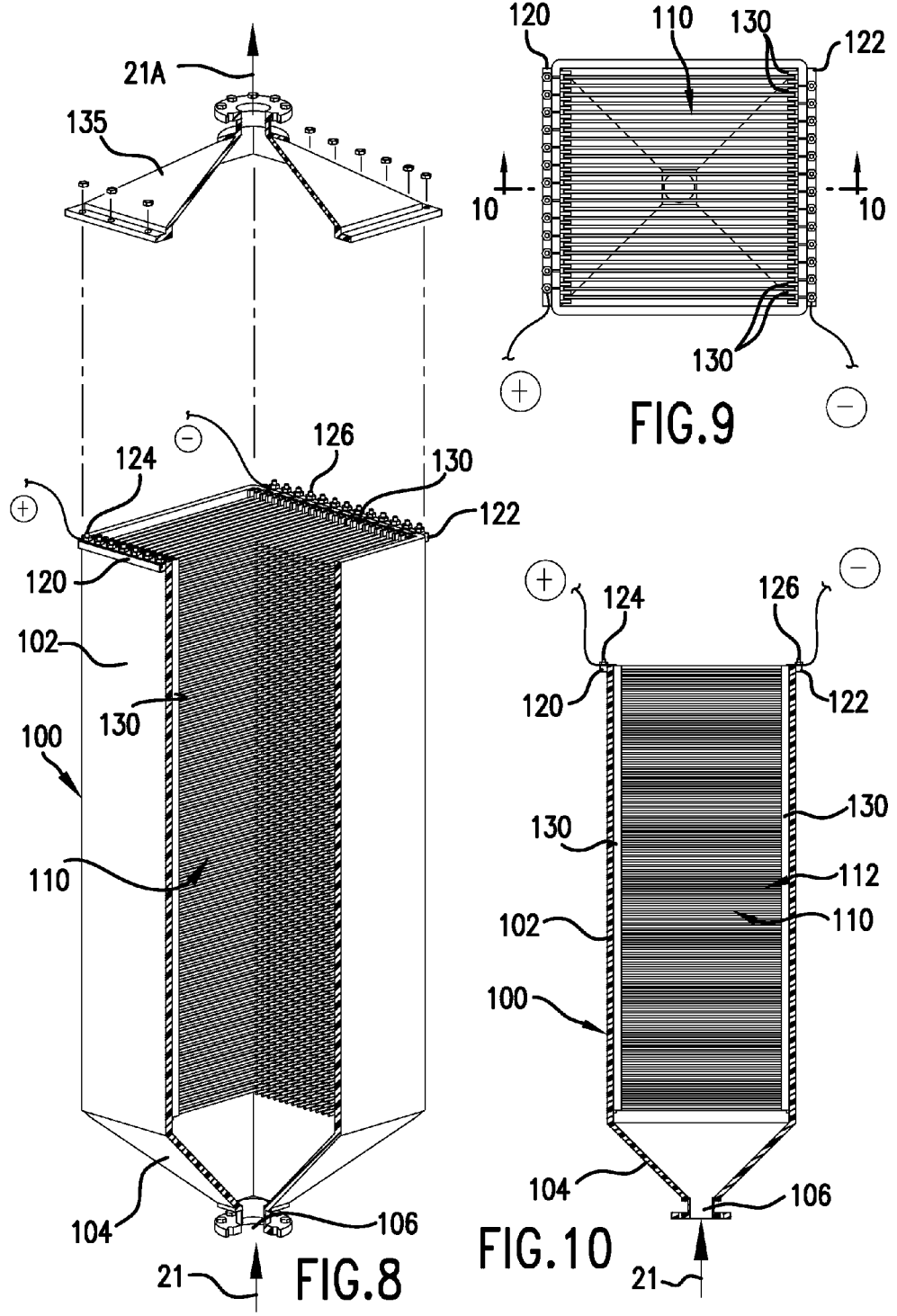

ELECTROCHEMICAL SYSTEM AND METHOD FOR THE TREATMENT OF WATER AND WASTEWATER

This application claims the benefit of the filing date of U.S. Provisional Application Ser. No. 61/075,842 filed Jun. 26, 2008, which is incorporated by reference herein.

FIELD OF THE INVENTION

This invention relates to water and wastewater treatment, and more particularly, but not limited to, treatment of surface water, groundwater, domestic sewage, industrial feed water, industrial process wastewater, hazardous and toxic wastes, liquid waste byproducts, the byproducts including, but not limited to, waste biosolids and membrane reject water.

BACKGROUND OF THE INVENTION

A variety of methods have been used to treat and remove contaminants from water and wastewater. The procedures and techniques actually used by municipal utilities for the treatment of drinking water and sanitary sewage have remained largely unchanged for at least 40 years.

Municipal drinking water treatment typically involves pumping surface (river or reservoir) water to a high energy mixing tank where alum and/or lime is added. The water then flows into a low energy mixing tank where chemically bound sediment floc is formed. From the flocculation tank the water flows into a gravity clarification tank, then on to a granular media filter and finally the water is disinfected with chlorine prior to distribution.

Municipal treatment of groundwater (wells) tends typically to involve the addition of a strong oxidant such as chlorine or potassium permanganate to oxidize a variety of dissolved pollutants such as iron, manganese, trace organics, heavy metals, radionuclides and bacteria. The chemically treated groundwater is then filtered and disinfected prior to distribution.

Municipal treatment of sanitary sewage typically includes screening to remove large solids, treatment of dissolved organics through a process generically referred to as activated sludge, gravity settling (clarification), then filtration and finally disinfection. In the past chlorine was commonly used for the disinfection of both water and wastewater, but as a result of recognition by the US EPA that byproducts of chlorine may be potentially carcinogenic, new regulations have been passed limiting the widespread use of chlorine and requiring the reduction or elimination of disinfection byproducts. Consequently, ultraviolet light has emerged as the disinfectant of choice.

Because procedures and techniques for treating water and wastewater have advanced little over the past 40 years, there is a glaring need for new methods and systems for treating water and wastewater that is efficient, effective and reliable and which produces minimal waste byproducts (sludge).

Prior art attempts to improve systems and electrochemical treatment methods for wastewater treatment have not been satisfactory. Those reported in the literature have utilized either parallel electrified plates made of iron or aluminum as electrodes, or a single rod within a cylinder made of iron or aluminum as electrodes. In the case of the parallel plates, the electrical charge density on the plates is insufficient to properly treat the water or wastewater unless the plate spacing is minimal (less than ¼"; 0.365 cm). This typically results in rapid plugging or clogging of the treatment unit. In the case of a single rod within a cylinder, often the spacing between the central rod and the perimeter wall is so great as to be ineffective in creating a sufficiently strong charge density to completely treat water or wastewater.

Classically, the efforts of the past have focused on the use of either parallel plates or center rods inside a tube as the positively and negatively charged electrodes. Due to the inefficiency of the plate designs, it was considered necessary to minimize plate spacings which quickly resulted in fouling of treatment units. The center rod and tube designs experienced similar problems and attempted to use high voltage potentials to overcome ineffectiveness. In one approach, using electrochemical cells in series with varying electrode materials was tried to achieve the desired treatment effectiveness. In every case, treatment technologies proved to be physically self-limiting and scaling factors (enlarging the units) became problematic. Furthermore, these approaches were typically characterized by high energy consumption as attempts to reach intended treatment levels were explored. This fact became a significant barrier to practical commercialization. Previous attempts to develop effective electrochemical technologies for treatment of water and wastewater resulted in processes that were very expensive to operate and not effective.

SUMMARY OF THE INVENTION

The present invention described herein relates to methods of and systems for efficiently and effectively removing a broad range of contaminants from water and wastewater including, but not limited to, surface water, groundwater, industrial process water, sanitary sewage, industrial wastewater, water containing hazardous or toxic materials, stormwater runoff containing a variety of organic and inorganic pollutants and contaminants and fluid streams containing byproducts of conventional water treatment and waste activated sludge treatment from domestic wastewater treatment plants.

The systems and methods described herein achieve treatment and removal of dissolved and particulate, organic and inorganic contaminants by means of a variety of treatment and removal processes. The processes include, but are not limited to, electro-coagulation, electro-flocculation, electro-flotation, electrochemical oxidation, electrochemical reduction, electrolysis of water and other molecules, dissociation of water and other molecules and both organic and inorganic ions, production of free radicals in the aqueous solution, electrical charge neutralization, decrease of Zeta potential, electroplating, and electrical voltage potential resulting in the destruction of bacteria and viruses.

The systems and methods described herein effectively treat, oxidize, remove or destroy a broad range of contaminants including but not limited to the following:
  heavy metals such as chromium, lead, mercury, cadmium, copper and zinc,
  arsenic from groundwater,
  petroleum oils in the form of refinery wastes, well drilling spoils, runoff from transportation activities including truck and vehicle washing and airport fueling operations,
  contaminants generated by marine vessels including military ships, merchant marine vessels, cruise ships and pleasure crafts, including the treatment of bilge water,
  fats, oils and grease (FOGs) from a variety of sources including food production facilities such as slaughtering plants, dairies, mayonnaise, vegetable oil and salad dressing plants, bakeries, fish processing plants, rendering plants, and further processing and finished product plants, aquatic nuisance nutrients such as nitrogen in the form of nitrates and phosphates, organic and inorganic acid wastes, organic wastes high in biochemical oxygen demand (BOD) and high chemical oxygen demand (COD), organic wastes with long chain and complex organic compounds, pharmaceutical wastes, pharmaceuticals in urine and feces, wastes contaminated with phenolic compounds, wastes with high concentrations of organic and inorganic suspended or colloidal solids, wastes with high concentrations of toxic organics including cyanide, colloidal solids, sediment and algae from surface water, iron, manganese and nitrate from groundwater and organics, solids, nitrogen, phosphorous and bacteria from domestic sanitary sewage, The systems and methods described herein effectively achieve, but are not limited to, the following:

improvement of dewaterability of water and wastewater treatment plant sludges, achievement of drier solids cakes during dewatering, achievement of the condition of Class A solids, economical reduction the amount of polymer used for chemical precipitation, economical reduction of the amount of inorganic salts used for chemical precipitation, effective destruction of bacteria and viruses and achievement of "secondary" levels of treatment of raw domestic sewage, The systems and methods described herein effectively treat raw water or generated domestic sanitary sewage from such applications as remote oil and gas exploration camps, oil drilling rigs, military base camps and improves of drinking water and sanitary conditions in third world countries.

The systems and methods described herein utilize electrochemical treatment with direct electrical current to an electrochemical cell consisting of specially designed parallel rods situated parallel with the direction of flow. The design of the selective electrode materials and electrode spacing includes integrating the system's operating variables into an individual design which is then applied for the removal of a specific contaminant or a combination of contaminants that are present at specific concentrations within an aqueous stream for a specific application or industry. The cells may be single or plural in parallel or series arrays.

The systems and methods described herein take advantage of selective electrode materials which offer advantages one over the other for the removal of a specific contaminant or a combination of contaminants that may be present in an aqueous stream, or to achieve a specific byproduct chemistry based on either the further intended treatment steps or the ultimate fate of the byproducts of which are to be disposed. Selective electrode materials may include, but are not limited to, iron, aluminum, titanium, carbon fiber, stainless steel or any other effective electrode material.

The systems and methods described herein utilize specific electrode materials and configuration selection designed to achieve specific levels of treatment based on the specific contaminant or a combination of contaminants that are present at specific concentrations within the aqueous stream and the desired degree of treatment or removal. The variables which effect selective electrode material and configuration design include contaminants or the combination of contaminants to be removed, the concentrations of those contaminants, rates of flow, the pH of the aqueous streams and fluid conductivities. A resultant design is specifically developed to include selection of electrode material, electrode design configuration, electrode type, spacing between the electrodes, power to be applied and retention time in the electrochemical treatment unit selected. The resultant combination of variables results in both a specific electrical charge density or range and a specific ionic charge density or range.

Summary of the Electrochemical Treatment Method

A first step of overall electrochemical treatment methods involves the capture and transfer of the water or wastewater to an electrochemical treatment unit. This step includes pumping surface water, groundwater or wastewater to the electrochemical treatment unit.

A second step in overall electrochemical treatment methods involves passing the water or wastewater through an electrochemical treatment unit described in this application. In this step direct electrical current is applied and the rate of flow is adjusted to achieve a desired level of treatment based on the concentration of the contaminant or contaminants to be removed. Hydraulic residence time within the electrochemical treatment unit is in a range of about 15 seconds to about 2 minutes, depending on the concentration of the contaminant or contaminants to be removed.

A third step in overall electrochemical treatment methods involves passing effluent from the treatment unit through either a clarifier or filter for removal of any oxidized and/or precipitated solid particles remaining in the water.

Summary of the Electrochemical Treatment Apparatus

Multiple pairs of small diameter rods are employed to develop a strong charge density on electrodes to achieve effective treatment. By using multiple rods with a high charge density, the electrode spacing is greater than ¼" (0.635 cm), for example up to about one inch (2.54 cm) which allows for smooth and efficient flow through the treatment unit without a propensity of clogging.

DETAILED DESCRIPTION OF THE DRAWINGS

The novel features which are believed to be characteristic of the present invention, as to its structure, organization, use and method of operation, together with further objectives and advantages thereof, will be better understood from the following drawings in which presently preferred embodiment(s) of the invention are now illustrated by way of example. It is expressly understood, however, that the drawings are for the purpose of illustration and description only and are not intended as a definition of the limits of the invention. Embodiments of this invention are described by way of example in association with the accompanying drawings in which:

FIG. 8 is a perspective, exploded view of a second embodiment of an electrochemical treatment cell, according to the invention, shown partially in section;

FIG. 9 is a top view of the treatment cell of FIG. 8;

FIG. 10 is a side elevation of the electrochemical cell of FIG. 9, taken along lines 10-10;

DETAILED DESCRIPTION OF EMBODIMENTS OF THE INVENTION

Figure 1:
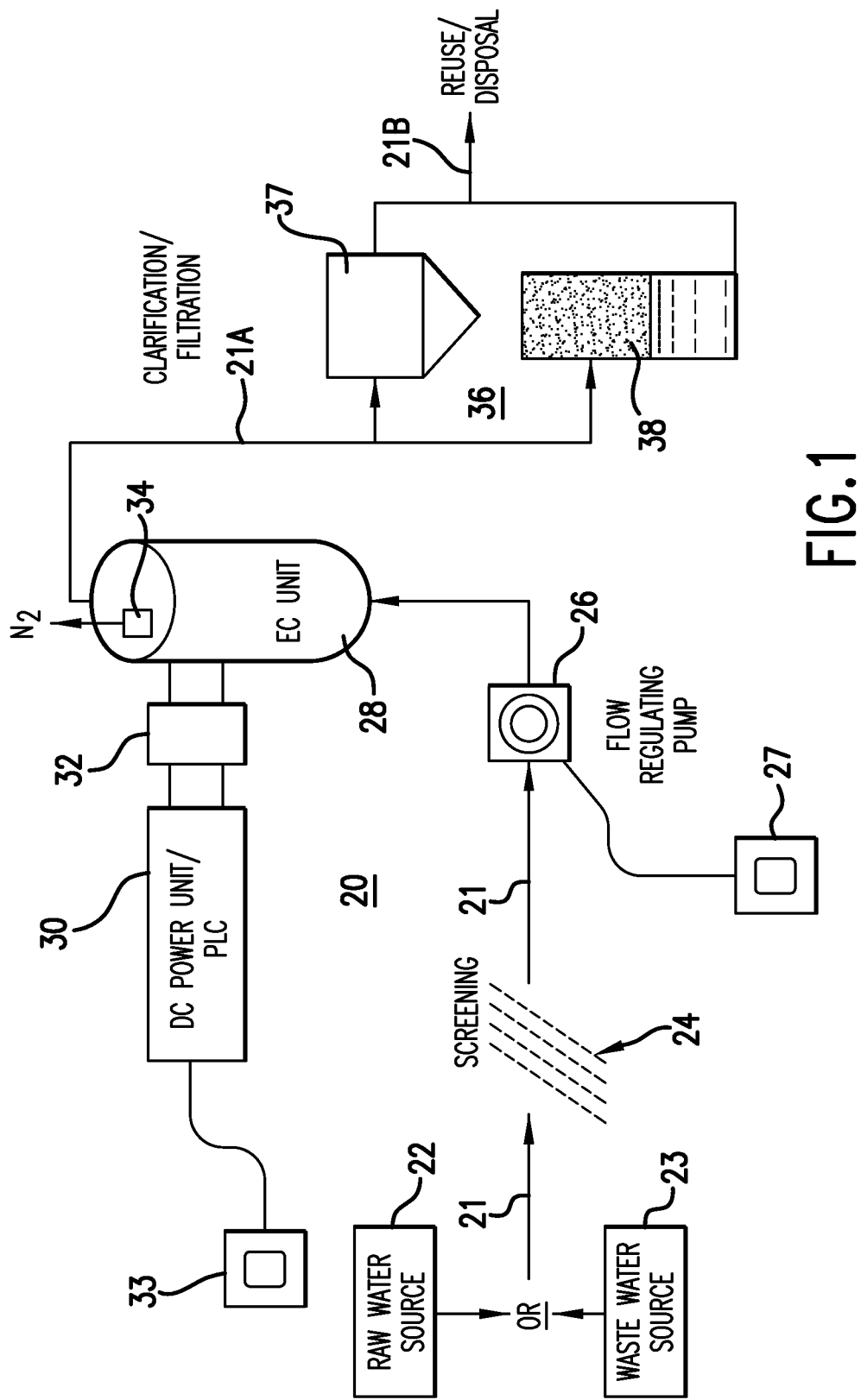
FIG. 1 is a schematic view of an electrochemical water and wastewater treatment system in accordance with the systems, apparatus and methods of the present invention.

A variety of organic and inorganic contaminants in water or wastewater are capable of undergoing direct electrochemical oxidation or reduction without the involvement of other substances or catalysts, except for the possible release of electrode material. A general understanding of this phenomenon is available from the following considerations of chemical equations and unbalanced portions of chemical equations.

Electrolysis of Water

In addition to organic and inorganic contaminants, water itself is also capable of undergoing electrochemical transformation including electrolysis and dissociation as follows:

Reaction at the Anode (Oxidation)

$$2H_2O \rightarrow O_2\uparrow + 4H^+ + 4e^-$$

Reaction at the Cathode (Reduction)

$$2H_2O + 2e^- \rightarrow H_2\uparrow + 2OH^-$$

The reaction at the cathode results in the production of both hydrogen gas and an abundance of free hydroxyl radicals. Conveniently, the hydrogen gas becomes useful for the ultimate flotation of and separation of precipitated chemical flocs, suspended and colloidal solids and fats, oils and grease from the aqueous solution. Conveniently, the free hydroxyl radicals serve as reducing agents for removal of such contaminants as heavy metals and to raise the pH of the water. This reaction is below to be helpful for:

Precipitation of Phosphorous
Precipitation of Heavy Metals
Oxidation of Nitrate and Nitrogen Compounds
Bacterial Kill
Oxidation of Iron $$Fe - 2e^- \rightarrow Fe^{+2}$$

$$Fe^{+2} - e^- \rightarrow Fe^{+3}$$

Oxidation of Organic Compounds (General)

Electrochemical oxidation of organic compounds occurs within an electrochemical cell when sufficient electrical potential differences (voltage) are applied to the anode and cathode electrodes. Due to the fact that organic compounds usually contain one of more high strength ionic and covalent bonds their oxidation proceeds simultaneously with the production of $O_2$ from the electrochemical oxidation of $H_2O$. The following formula provide a generic form of oxidation of organic compounds.

$$Org - e^- \rightarrow Oxidation\ products$$

Oxidation of Cyanide $$CN + 2OH^- = CNO^- + H_2O + 2e^-$$

Oxidation of Arsenic

Arsenic in groundwater is usually in the form of arsenite ($As^{-3}$). In the electrochemical cell fitted with iron electrodes the arsenite undergoes oxidation to arsenate ($As^{-5}$). In addition the iron released from the anodes combines with the arsenate to form the insoluble precipitate ferric arsenate as follows.

$$2H_3AsO_3 + 2H_2O \rightarrow H_3AsO_4^- + H_2\uparrow$$

$$2Fe^{+2} - 2e^- \rightarrow 2Fe^{+3}$$

$$2Fe^{+3} + 6H_2O \rightarrow 2FeOH_3 + H^2\uparrow$$

$$2FeOH_3 + 2H_3AsO_4^- \rightarrow 2FeAsO_4\downarrow + 6H_2O$$

Carbonates

Two major contaminants which cause water hardness are calcium bicarbonate, $Ca(HCO_3)_2$, and magnesium bicarbonate, $Mg(HCO_3)_2$. In a first electrochemical cell according to the invention, the bicarbonates are broken down by oxidation into the corresponding carbonate, water and carbon dioxide.

$$Ca(HCO_3)_2 \rightarrow CaCO_3 + H_2CO_3$$

The calcium carbonate is insoluble and will be captured by a filter. As the carbonates are strongly electronegative, some may plate out onto the anodes in the electrochemical cells. However, most of the carbonates do not adhere to the anodes. The carbonate acid, $H_2CO_3$, reacts with any calcium carbonate scaling in the downstream pipes re-dissolving it to soluble calcium bicarbonate. Over a period of time, scale will be removed.

$$CaCO_3(as\ scale) + H_2CO_3(dissolved\ CO_2) \rightarrow Ca(HCO_3)_2$$

As a result, the water undergoes a softening process and the downstream scaling is slowly dissolved.

Nitrogen Oxides

As nitrogen oxides such as $NO_3$, $NO_2$ and $NO$ undergo reduction in the electrochemical cells, the nitrogen oxides undergo the following reactions:

$$Cathode: 2NO_3 + 12H^+ + 10e^- \rightarrow N_2 + 6H_2O$$

$$Anode: 2H_2O \rightarrow 2H^+ + O_2 + 4e^-$$

These reactions are simplified versions of a multi-step process in which the nitrogen oxides are reduced. The nitrogen oxides are converted to nitrogen gas. In cases where contamination of the treated water is severely high, the amount of gas formed may be high enough to require evacuation from the system. In such cases, the gases are trapped in the head of the filter vessel onto which an air vent connected to the outdoors may be mounted.

In a further alternative, the iron anode may be replaced with an aluminum anode. When the current is applied to the electrochemical cell, the aluminum anode releases activated alumina into the solution. The activated alumina reacts with the arsenate to form aluminum arsenate. Aluminum arsenate is insoluble and will be captured in a downstream filter.

The foregoing discussion provides a theoretical basis as for the success of the method and system described herein.

In the present invention the laws of physics, chemistry, electricity, thermodynamics and hydraulics are applied in a cost effective way to treat water and wastewater electrochemically while avoiding the problems and pitfalls of the past. The key to successful electrochemical treatment of water and wastewater at atomic and molecular levels is properly applying combinations of voltage, amperage, hydraulic retention time and electrode material to provide effective electrical charge densities on electrodes and electrical potential between the electrodes to then produce desired electrochemical reactions. The system described herein utilizes parallel or substantially parallel electrode array configurations for incorporating the individual treatment units into a horizontal or vertical manifold to achieve both redundancy and provide for greater system capacity.

FIGS. 1-7

FIG. 1 is a schematic overall view of a water or wastewater electrochemical treatment system 20 configured in accordance with the present invention. Water 21 from a raw water source 22, or from a wastewater source 23, is screened at a screening station 24 to remove large solids which could damage downstream apparatus. The raw water source 22 can be a drilled or dug well or a body of water, such as but not limited to, a river, stream, lake, reservoir or any other source of potentially potable water. If the water 21 is from a wastewater source 23, the water can be from a sewage plant, an industrial wastewater site or from any other source of accumulated or flowing wastewater.

After the screening station 24 has removed large solids from the water 21 to prevent downstream damage, the water is pulled by a flow regulating pump 26 and conveyed to an electrochemical treatment unit 28 configured in accordance with the principles of the present invention. A monitor and control module 27 attached to the flow regulating pump 26 determines the hydraulic residence time within the electrochemical treatment unit 28, and thus depending upon applied electrical parameters, helps determine electrical charge density within the electrochemical treatment unit. A DC power unit 30 controlled by a controller 33 converts AC line current to DC and applies DC to the electrochemical treatment unit 28 while a polarity reverser 32 allows the DC to be reversed periodically in order to minimize the possibility of clogging in the electrochemical unit 28. A selected contaminate or multiple contaminates are removed form the water stream 21 by the electrochemical treatment unit 28 while an uncontaminated water stream 21A flows to a clarification/filtration station 36. If a gas, such as nitrogen ($N_2$), is separated from the water stream 21 in the electrochemical treatment unit 28, the gas may vented by a vent 34.

If the treated water stream 21A still contains suspended solid particulates precipitated by the electrochemical treatment unit 28, the suspended solid particulates are removed by a clarification/filtration station 36, which comprises either a gravitational or centrifugal separation unit 37, or a filtration unit 38. In some situations it may be necessary to use both gravitational or centrifugal separation, as well as filtration in order to provide an uncontaminated water stream 21B which may be for initial use or reuse, or for disposal back into the environment.

FIGS. 2-6 illustrate an initial embodiment of an electrochemical module 40 for use as the electrochemical treatment unit 28, or for use as a stand alone electrochemical treatment unit. The module 40 is an initial prototype of an electrochemical treatment unit formed as a cell, which may be combined with other similar cells when practicing the invention. The module 40 has a horizontal orientation in FIG. 2 and has successfully demonstrated that dissolved nitrogen and dissolved phosphorous compounds are removed from a water stream 21 contaminated therewith when mechanical parameters such as electrode spacing, speed of the pump 26 and volume of the module 40 are considered in combination with electrical parameters, such as potential, amperage and rates of polarity change. Using the module 40, Applicant was able to decontaminate a water flow 21 without clogging of the module, a drawback that has prevented current commercial use of electrochemical decontamination for water treatment.

Figure 2:
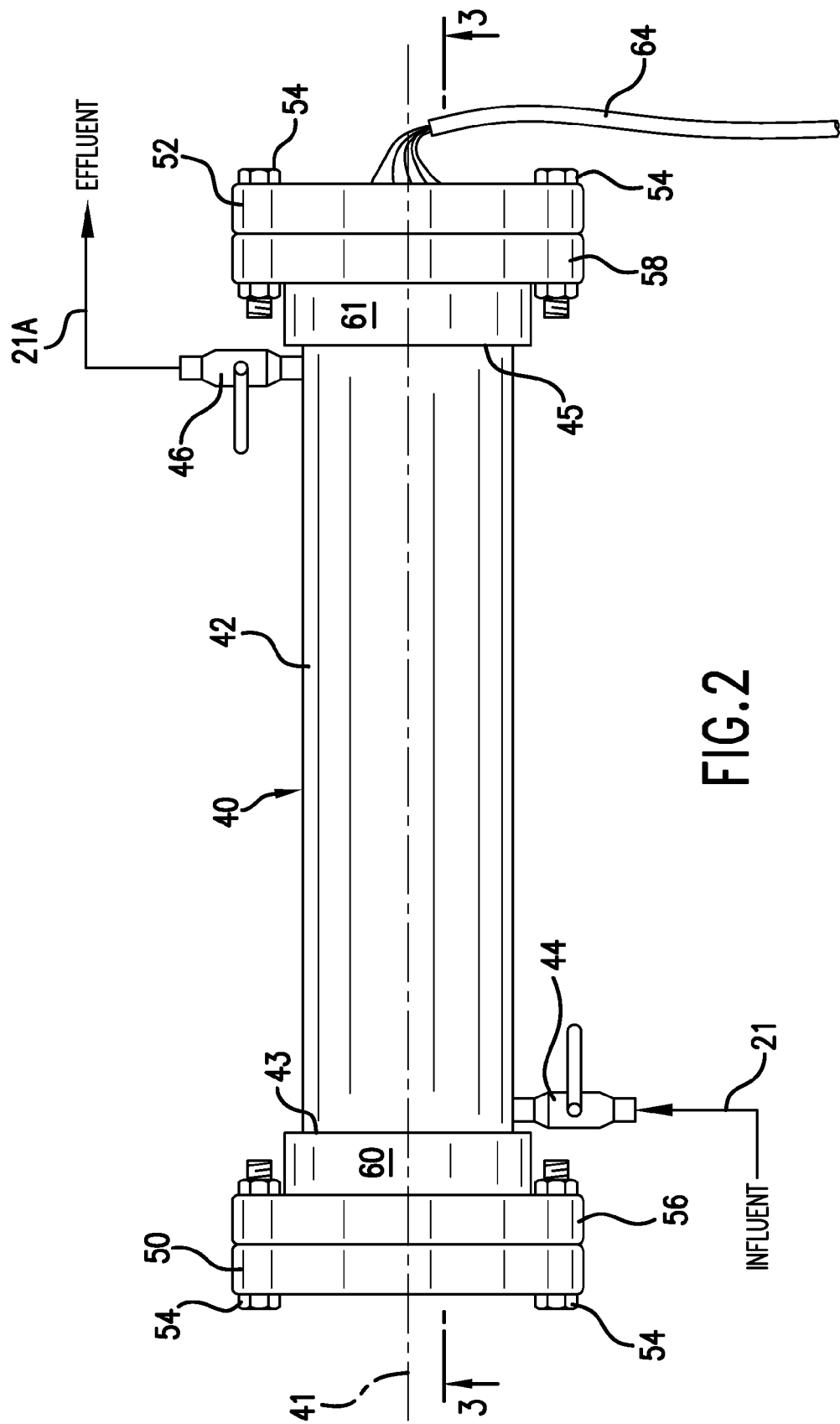
FIG. 2 is a side view of an electrochemical treatment cell according to an initial embodiment of the invention oriented horizontally.

As is seen in FIG. 2, module 40 is aligned, or substantially aligned, with a horizontal axis The module 40 comprises a cylindrical chamber 42 made of a dielectric material such as polyvinylchloride (PVC) and having at a first end portion 43 an inlet 44 that receives an influent in the form of the water stream 21. At a second end portion 45, an outlet 46 releases an effluent stream in the form of the water stream 21A in which previously dissolved contaminants have been separated from the water and exist in the form of relatively small particulates that are subsequently filtered, or in the form of gas that is subsequently vented. The first and second ends 43 and 45 of the chamber 42 are closed by end caps 50 and 52, respectively, made of a dielectric material such as PVC. The end caps 50 and 52 are bolted by bolts 54 to inverting rings 56 and 58, respectfully, that are received around the first and second ends 43 to 45 of the chamber 42 and are positioned in abutment with end sleeves 60 and 61 fixed to the cylindrical chamber 42. Positively charged and negatively charged leads 64 extend from the second end cap 52 on the cylindrical chamber 42 and are attached to electrodes within the chamber.

Figure 3:
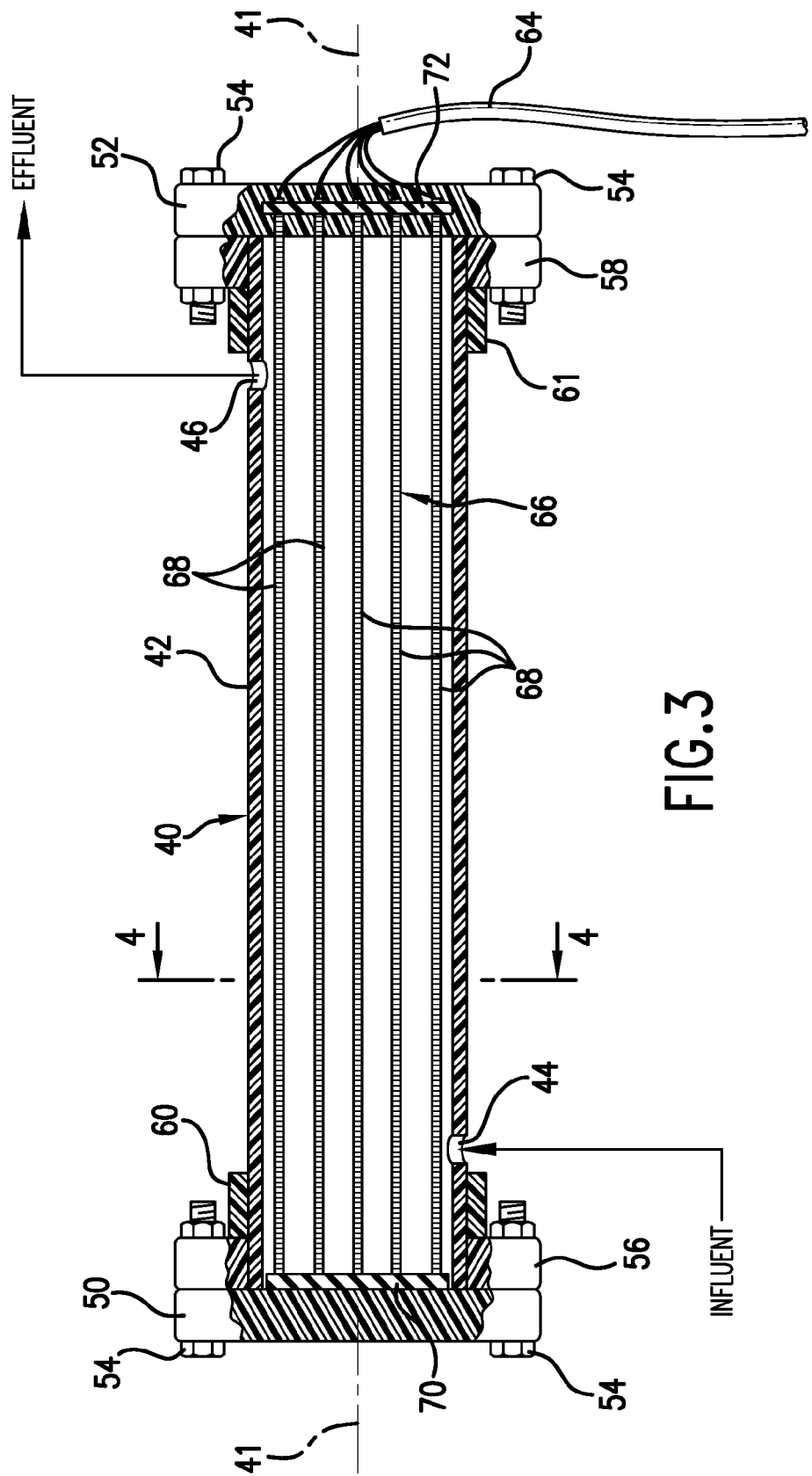
FIG. 3 is a side view partially in elevation taken along lines 3-3 of FIG. 2 showing an array of electrodes within the electrochemical treatment cell.
Figure 4:
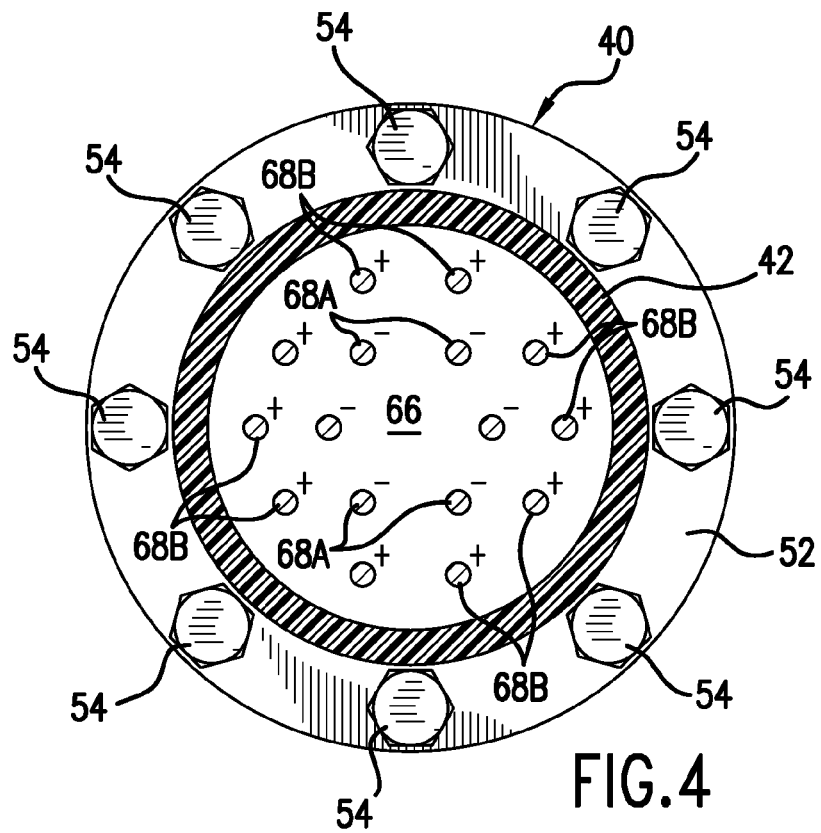
FIG. 4 is an end view, partially in elevation, taken along lines 4-4 showing of FIG. 3 a charge distribution on the array of electrodes shown in FIG. 3.
Figure 5:
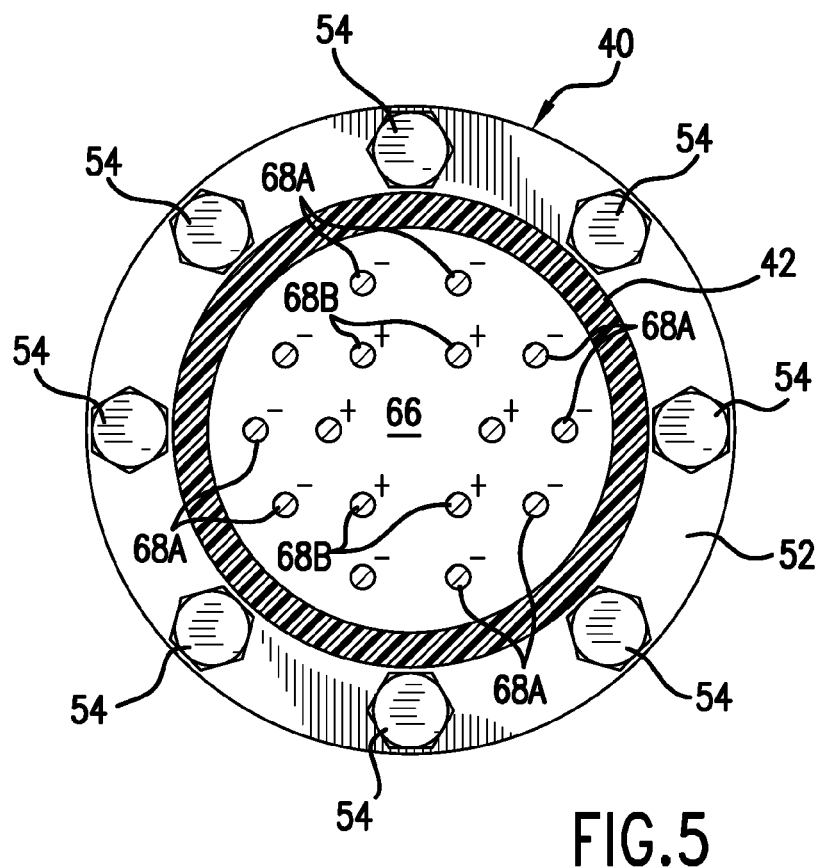
FIG. 5 is an end view similar to FIG. 4 showing a reversed charge distribution on the array of electrodes of FIGS. 3 and 4.

Referring now to FIGS. 3-5, it is seen that within the chamber 42 an array 66 of electrodes 68, configured as rods, are imbedded in a separator 70 of insulating material adjacent to the first end cap 50, and imbedded in an insulator 72 of insulating material, at the second end cap 52 so that the electrodes 68 are electrically isolated from one another. In order to ionize and remove dissolved contaminates, it is necessary to set up electrical charge gradients within the chamber 42 by negatively charging one portion of the array 66 of electrodes 68 and positively charging another portion of the array 66 of electrodes 68.

As is seen in the end views of FIGS. 4 and 5, one array of electrodes 68A has a negative charge (−) while another array of electrodes 68B has a positive charge (+). This creates ionization within the water 21 being treated. In order to prevent clogging of electrodes 68B attracting negatively charged ions, the polarity of the arrays 66A and 66B are periodically reversed, as is shown by comparing FIGS. 4 and 5. By applying DC current at low voltage and keeping the influent water 21 moving though the chamber 42 at a selected speed so that hydraulic retention time is sufficient to obtain ionization of contaminates suspended in particulate form in the water 21 being treated, and by periodically reversing the polarity of the electrode arrays, clogging of the space between electrodes array 66A and 66B is avoided. Since the particulate contaminates remain suspended, the particulates can be removed by settlement and filtration at station 36 of FIG. 1.

Figure 6:
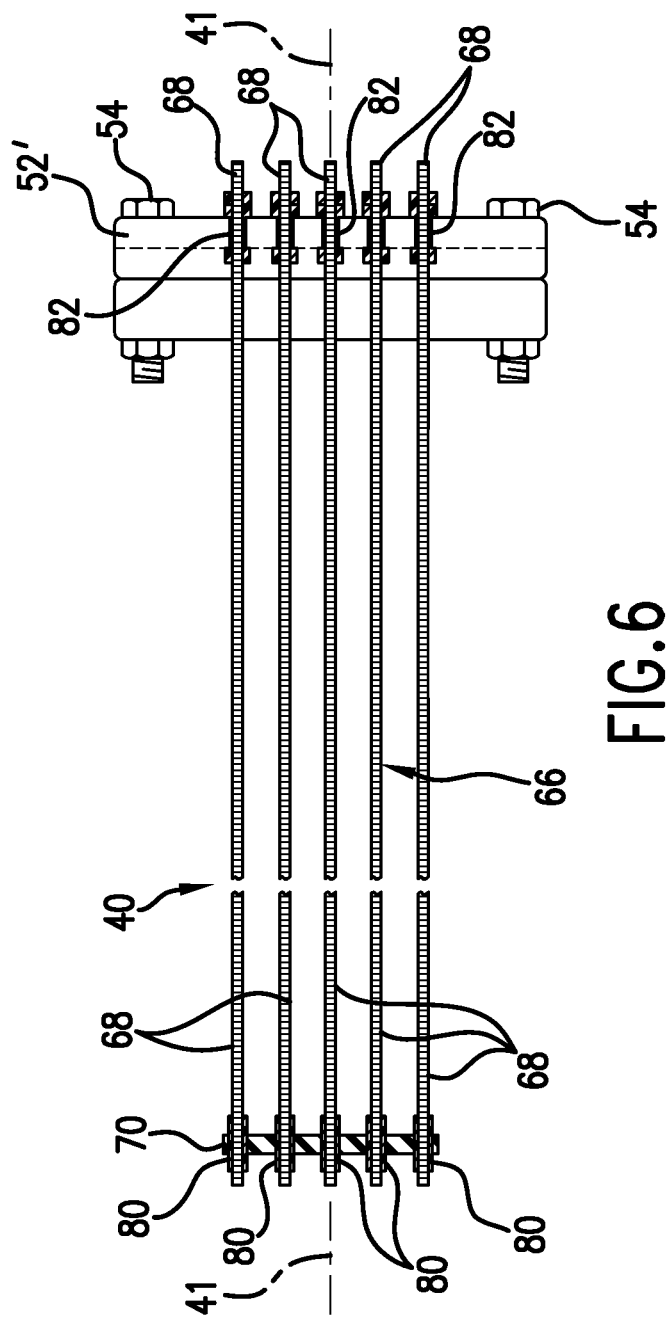
FIG. 6 is a side elevational view of the electrochemical treatment cell of FIGS. 2-5 with the housing removed showing details of an arrangement for mounting the electrodes.

Further with respect to the embodiment of FIGS. 2-6, FIG. 6 shows a practical way in which to install the electrode array 66 wherein the electrodes 68 are retained by the first insulator 70 located at end cap 50 using bushings 80 and retained by the second insulator 72 at second end cap 52' by bushings 82. In the arrangement of FIG. 6, the end caps 50 and 52' are made of an insulating material such as PVC.

Figure 7:
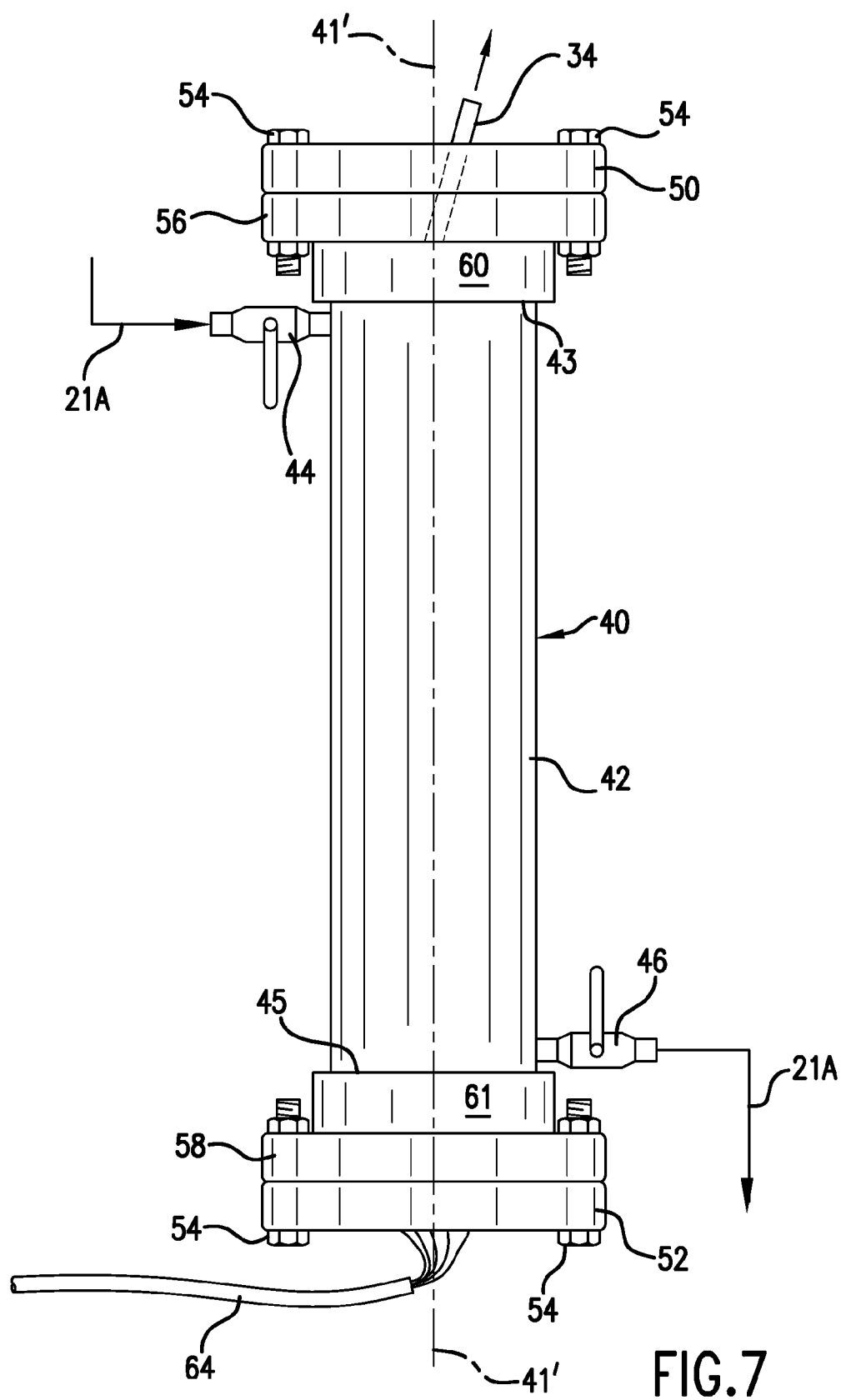
FIG. 7 is a side view of an electrochemical treatment cell similar to that of FIG. 2 but oriented vertically.
Figures 11, 12:
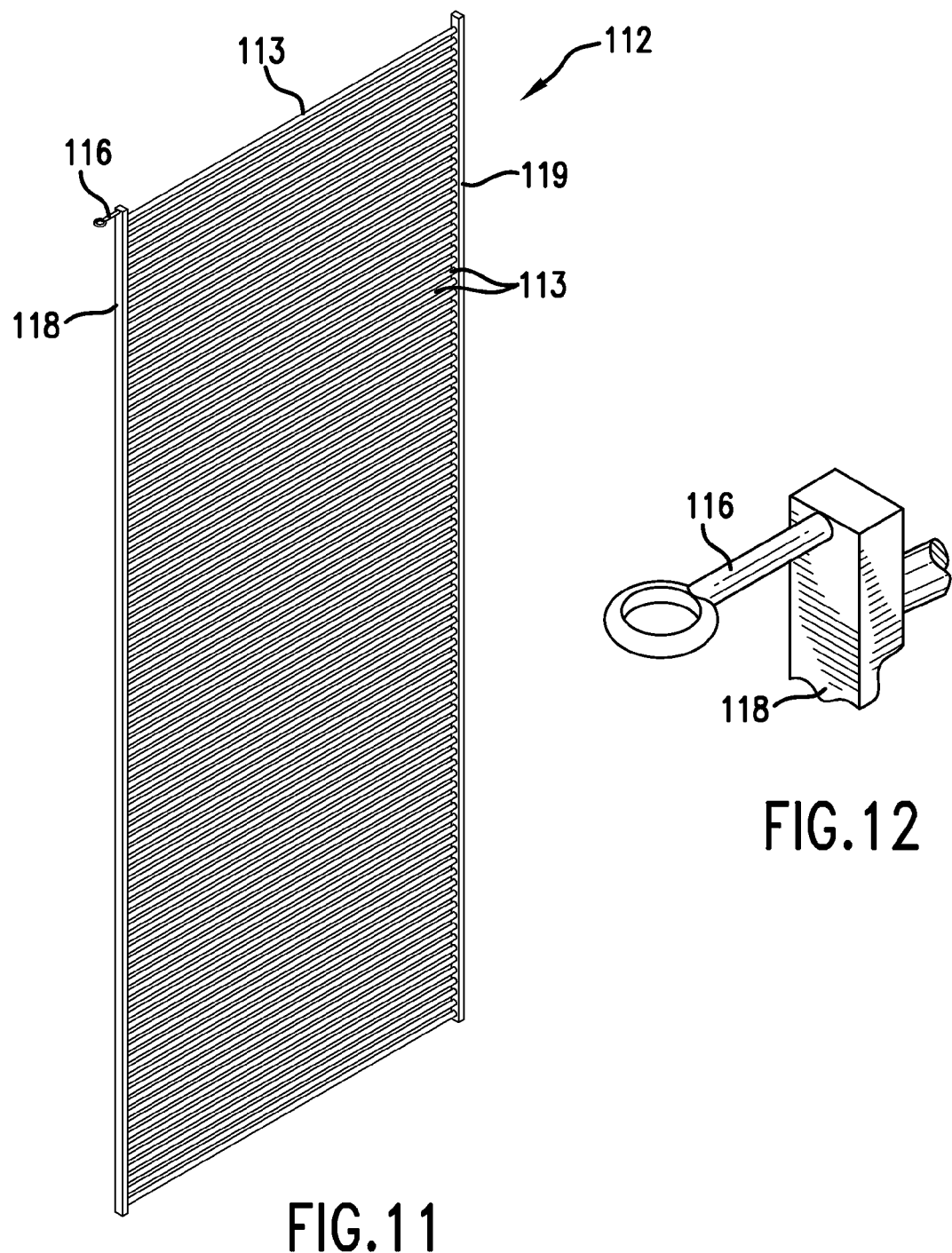
FIG. 11 is a perspective view of an electrode rod sheet used with the electrochemical treatment cell of FIGS. 8-10.
FIG. 12 is an enlarged view of a connector used with the electro rod sheet of FIG. 11.

While the module 40 is shown aligned with a horizontal axis in FIG. 2, the module 40 is oriented with a vertical axis 41' in the second embodiment of the invention shown in FIG. 7. This takes advantage of the tendency of gas to flow upwardly allowing gas to vent via a vent 34 now disposed proximate the upper end 43 of the chamber 42 of the module 40.

The key to successful electrochemical treatment of waste and raw water at atomic and molecular levels is effective application of voltage, amperage, hydraulic retention time and electrode material in combination to provide electrical charge densities on the electrodes and electrical potential between the electrodes to produce a desired electrochemical reaction.

The following Charts A, B and C cite test data from testing the prototype illustrated in FIGS. 2-7 of the drawings. The parameters used occur within testing ranges initially selected by the inventor, which ranges do not limit the scope of the inventor's invention. The test data establish that the inventor has eliminated, or at least minimized, clogging of spaces between electrodes 68 by contaminants when electrochemically removing contaminants from water within the module 40.

As is evident from the charts, preferred test ranges are as follows:

DC Voltage: about 10 volts to about 50 volts,
DC Amperage: about 15 amps to about 35 amps,
Hydraulic retention time: about 2 minutes to about 5 minutes,
Spacing between electrodes: about 0.75 inch (1.90 cm), and
Polarity switching cycle: performed manually at intervals of about 5 minutes.

The ranges and specific parameter values recited in the Charts A, B and C are within larger contemplated ranges as follows:

DC Voltage: about 10.0 volts to about 60 volts,
DC Current: about 5.0 amps to about 50.0 amps,
Hydraulic Retention Time: about 30 seconds to 5 minutes, about 2 minutes, 30 seconds being preferred
   Electrode Diameters: about 0.25 inch (0.635 cm) is preferred, but the electrodes may be effective at other diameters
   Electrode Spacing: preferably >0.25 inch (0.635 cm)
   Electrode Materials: iron, copper, carbon, aluminum.
   Electrode Shape: The electrodes may have any shape effective to accomplish the invention, such as but not limited to: cylindrical rods, perforated or unperforated flat plates, undulating plates or rods.
   Polarity Change Cycle: about 1 minute to 15 minutes.

While the cylindrical module 40 used to demonstrate the effectiveness of the invention has a length of 25 inches (63.5 cm) and a diameter of 6 inches (15.24 cm), a module used to practice the invention may have any dimensional configuration that achieves similar useful results. The electrodes 68 of the illustrated electrode array 66 are iron rods that are circular in cross section and have a diameter of ¼ inch (2.54 centimeters). The cylindrical module 40 has dimensions which are suitable for intermittent flow wherein the water being treated remains in the module for a time sufficient to apply various voltages and amperages to achieve a range of test results such as those of the Charts A, B and C.

A preferable practice is to have an array of modules, configured to achieve results similar to the module 40, wherein individual modules can be readily replaced if necessary. The module can be arranged with other modules in parallel or serial arrays, or unparallel and serial arrays, to accomplish removal of contaminants from waste water or raw water. In order to increase hydraulic retention time, recycling of partially decontaminated water can be performed in order to further decontaminate already treated water.

Module construction can be scaled up to a much larger individual size, for example, a size suitable to decontaminate waste water discharged from sewerage plants. Also, module construction can be scaled much smaller, for example to decontaminate tap water or water entering a home or a community, so as to remove endocrine disrupting compounds and personal care products from potable water. Modules scaled even smaller and using DC current from batteries and/or solar cells are usable to decontaminate raw water for drinking by campers, hunters and hikers, as well as to decontaminate raw water for military personnel.

The principles of the present invention, as exemplified in by the module 40 of FIGS. 2-7, can be used to treat waste water and/or bilge water prior to discharge from ships and pleasure boats to remove contaminants. It is also contemplated that these principles are applicable to removing salt from sea water when sea water is used as a source of raw water for ships or perhaps agriculture, and for removing urea from urine recirculated to provide drinking water for astronauts.

Charts A, B and C are test results establishing the effectiveness of the method and system in removing various contaminants from water and aqueous solutions.

CHART A

| Electrochemical Treatment of Municipal Wastewater Plant 1 | | | |
|---|---|---|---|
| Contaminant | Raw BOD[1] | Raw Phos | Raw TKN[2] |
| Electrode Material | Iron | Iron | Iron |
| Electrode Spacing (inches; centimeters) | 0.75; 1.905 | 0.75; 1.905 | 0.75; 1.905 |
| Power Supplied to the System | 120 Volt AC | 120 Volt AC | 120 Volt AC |
| DC Voltage Applied | | | |
| Low | 10 | 10 | 10 |
| Medium | 30 | 30 | 30 |
| High | 50 | 50 | 50 |
| Amperage Applied | | | |
| Low | 15 | 15 | 15 |
| Medium | 25 | 25 | 10 |
| High | 35 | 35 | 15 |

CHART A-continued

Electrochemical Treatment of Municipal Wastewater Plant 1

Hydraulic Retention Time (minutes)

| | | | |
|---|---|---|---|
| Low | 1 | 1 | 1 |
| Medium | 3 | 3 | 3 |
| High | 5 | 5 | 5 |
| Untreated Concentration (mg/l) | 350 | 6.9 | 62 |

EC Treated Concentration (mgl)

| | | | |
|---|---|---|---|
| Low | 52 | 4.4 | 44 |
| Medium | 34 | 1.3 | 39 |
| High | 26 | 0.8 | 31 |

Percent Removal

| | | | |
|---|---|---|---|
| Low | 85 | 36 | 29 |
| Medium | 90 | 81 | 37 |
| High | 93 | 88 | 50 |
| Contaminant | Effluent Nitrate | Effluent E Coli | Primary Phos |
| Electrode Material | Iron | Iron | Iron |
| Electrode Spacing (inches; centimeters) | 0.75; 1.905 | 0.75; 1.905 | 0.75; 1.905 |
| Power Supplied the System | 120 Volt AC | 120 Volt AC | 120 Volt AC |

DC Voltage Applied

| | | | |
|---|---|---|---|
| Low | 10 | 10 | 10 |
| Medium | 30 | 30 | 30 |
| High | 50 | 50 | 50 |

Amperage Applied

| | | | |
|---|---|---|---|
| Low | 15 | 15 | 5 |
| Medium | 25 | 25 | 10 |
| High | 35 | 35 | 15 |

Hydraulic Retention Time (minutes)

| | | | |
|---|---|---|---|
| Low | 1 | 1 | 1 |
| Medium | 3 | 3 | 3 |
| High | 5 | 5 | 5 |
| Untreated Concentration (mg/l) | 16.8 | >1,600 | 2.3 |

EC Treated Concentration (mgl)

| | | | |
|---|---|---|---|
| Low | 0.2 | 0 | 0.8 |
| Medium | 0.2 | 0 | 0.3 |
| High | 0.2 | 0 | 0.3 |

Percent Removal

| | | | |
|---|---|---|---|
| Low | 99 | 99+ | 65 |
| Medium | 99 | 99+ | 87 |
| High | 99 | 99+ | 87 |

[1]BOD-Biochemical Oxygen Demand
[2]TKN-Total Kjeldahl Nitrogen (sum of organic nitrogen, ammonia and ammonium)

CHART B

Electrochemical Treatment of Municipal Wastewater Plant 2

| | | | |
|---|---|---|---|
| Contaminant | Filter Eff BOD[1] | Filter Eff TOC[3] | Effluent Ph |
| Electrode Material | Iron | Iron | Iron |
| Electrode Spacing (inches; centimeters) | 0.75; 1.905 | 0.75; 1.905 | 0.75; 1.905 |
| Power Supplied to the System | 120 Volt AC | 120 Volt AC | 120 Volt AC |

DC Voltage Applied

| | | | |
|---|---|---|---|
| Low | 10 | 10 | 10 |
| Medium | 30 | 30 | 30 |
| High | 50 | 50 | 50 |

Amperage Applied

| | | | |
|---|---|---|---|
| Low | 15 | 15 | 15 |
| Medium | 25 | 25 | 10 |
| High | 35 | 35 | 15 |

Hydraulic Retention Time (minutes)

| | | | |
|---|---|---|---|
| Low | 1 | 1 | 1 |
| Medium | 3 | 3 | 3 |
| High | 5 | 5 | 5 |
| Untreated Concentration (mg/l) | 4 | 34 | 6.4 |

CHART B-continued

Electrochemical Treatment of Municipal Wastewater Plant 2

EC Treated Concentration (mgl)

|  |  |  |  |
|---|---|---|---|
| Low | <2 | 28 | 6.9 |
| Medium | <2 | 27 | 8.0 |
| High | <2 |  | 8.3 |

Percent Removal

|  |  |  |  |
|---|---|---|---|
| Low | 50+ | 18 | NA |
| Medium | 50+ | 21 | NA |
| High | 50+ |  | NA |
| Contaminant | Effluent Nitrate | Effluent E Coli | Primary Phos |
| Electrode Material | Iron | Iron | Iron |
| Electrode Spacing (inches, centimeters) | 0.75; 1.905 | 0.75; 1.905 | 0.75; 1.905 |
| Power Supplied to the System | 120 Volt AC | 120 Volt AC | 120 Volt AC |

DC Voltage Applied

|  |  |  |  |
|---|---|---|---|
| Low | 10 | 10 | 10 |
| Medium | 30 | 30 | 30 |
| High | 50 | 50 | 50 |

Amperage Applied

|  |  |  |  |
|---|---|---|---|
| Low | 20 | 15 | 5 |
| Medium | 30 | 25 | 10 |
| High | 40 | 35 | 15 |

Hydraulic Retention Time (minutes)

|  |  |  |  |
|---|---|---|---|
| Low | 1 | 1 | 1 |
| Medium | 3 | 3 | 3 |
| High | 5 | 5 | 5 |
| Untreated Concentration (mg/l) | 16.7 | >1,600 | 3.5 |

EC Treated Concentration (mgl)

|  |  |  |  |
|---|---|---|---|
| Low | 10.1 | 0 | 0.6 |
| Medium | 0.1 | 0 | 0.3 |
| High | 0.3 | 0 | 0.2 |

Percent Removal

|  |  |  |  |
|---|---|---|---|
| Low | 40 | 99+ | 83 |
| Medium | 99 | 99+ | 91 |
| High | 98 | 99+ | 94 |

[1]BOD-Biochemical Oxygen Demand
[3]TOC-Total Organic Carbon (includes, but is not limited to, pharmaceutical products, such as antibiotics and endocrine disrupting compounds exemplified estrogen compounds, and to personal and household care products, such as cosmetics and deodorant sprays).

CHART C

Electrochemical Treatment of Beverage Plant Wastewater

| Contaminant | Phosphorous | Copper | pH |
|---|---|---|---|
| Electrode Material | Iron | Iron | Iron |
| Electrode Spacing (inches, centimeters) | 0.75; 1.905 | 0.75; 1.905 | 0.75; 1.905 |
| Power Supplied to the System | 240 Volt AC | 240 Volt AC | 240 Volt AC |

DC Voltage Applied

|  |  |  |  |
|---|---|---|---|
| Low | 10 | 10 | 10 |
| Medium | 30 | 30 | 30 |
| High | 50 | 50 | 50 |

Amperage Applied

|  |  |  |  |
|---|---|---|---|
| Low | 5 | 10 | 10 |
| Medium | 20 | 20 | 20 |
| High | 35 | 30 | 30 |

Hydraulic Retention Time (minutes)

|  |  |  |  |
|---|---|---|---|
| Low | 1 | 1 | 2 |
| Medium | 3 | 3 |  |
| High | 5 | 5 | 5 |
| Untreated Concentration (mg/l) | 3.50 | 0.075 | 6.3 |

CHART C-continued

Electrochemical Treatment of Beverage Plant Wastewater

EC Treated Concentration (mgl)

|  |  |  |  |
|---|---|---|---|
| Low | 1.64 | ND | 7.0 |
| Medium | 1.04 | ND | 8.3 |
| High | 0.62 | ND | 8.9 |

Percent Removal

|  |  |  |  |
|---|---|---|---|
| Low | 53 | 99+ | NA |
| Medium | 70 | 99+ | NA |
| High | 82 | 99+ | NA |

The electrodes 66 used to develop the data of charts A, B, and C are circular iron electrodes having a diameter of ¼ inch (0.635 cm). For purposes of this invention the electrodes have a preferable range of ⅛ inch (0.317 cm) to ⁵⁄₁₆ inch (0.794 cm), however, the diameter may be substantially smaller wherein the electrodes have diameters which are measured in terms of wire gauge.

FIGS. 8-12

Referring now to FIGS. 8-12 there is shown another embodiment of an electrochemical cell, but configured as a square module 100 having an increased water treatment capacity over that of FIGS. 2-7. The square module 100 is a system or device that has a housing 102 which is square in cross section and is made of a dielectric material such as fiberglass. The square housing 102 has a tapered inlet portion 104 with a flanged opening 106 into which and influent such as, but not limited to, water 21 from a raw water source 22 or a waste water source 23 (see FIG. 1) is introduced.

The water 21 flows upwardly through a bank 110 of individual electrode rod sheets or panels 112 having individual rods 113 which are preferably circular in cross section. (See FIG. 11). The electrode rod sheets or panels 112 are connected to eyelets 116 along one bus bar 118 of each electrode rod sheet or panel 112. The bus bars 118 establish an electrical connection with buses 120 and 122, buses having threaded posts 124 and 126 thereon. The electrode rod sheet or panel 112 has buses 118 and 119 which provide either a positive (+) or a negative (−) polarity to the rods 113 that extend therebetween. The rods 113 are preferably circular and have a spacing of about ¾ inch (1.905 cm). The buses 120 and 122 have opposite electrical charges (+ and −) thereon so that all electrode rod sheets or panels 112 connected to the bus bar 120 have a positive charge and all electrode rod sheets or panels 112 connected to the bus bar 122 have a negative bias. Periodically, the polarity reverser 32 (see FIG. 1) reverses polarity on the buses 120 and 122 in order to minimize the possibility of clogging within the electrode rod sheet bank 110. Within the housing 102, the electrode rod sheets or panels 112 are electrically insulated from one another by dielectric spacers 130 (see FIGS. 8 and 9) while adjacent electrode rod sheets 112 have electrical connections 124 and 126 of different polarities so that adjacent electrode rod sheets have opposite polarities. If over time, the individual rods 113 comprising the rod sheets or panels 112 degrade, the electrode rod sheets 112 may be readily withdrawn from the housing 102 and replaced.

A converging outlet portion 135 of the housing 102 for the module 100 is shown in FIG. 8 detached from the housing 102 so that the electrode rods sheets or panels 112 may be readily replaced. The outlet portion 135 is attached during operation of the module 100 to direct the outflow 21A to a clarification and filtration station such as station 36 (see FIG. 1).

The module 100 of FIGS. 8-12 has a processing rate of 50+gallons per minute and has a width of 2 to 3 feet. In practicing this invention to remove remaining contaminants from sewage discharge water 21, numerous electrochemical modules, such as the module 100, are connected in parallel to form a water treatment system. For example, at a rate of 50 gallons per minute one hundred electrochemical modules 100 will decontaminate about seven million gallons of water per day.

* * * *

FIGS. 13-19

Figure 13:
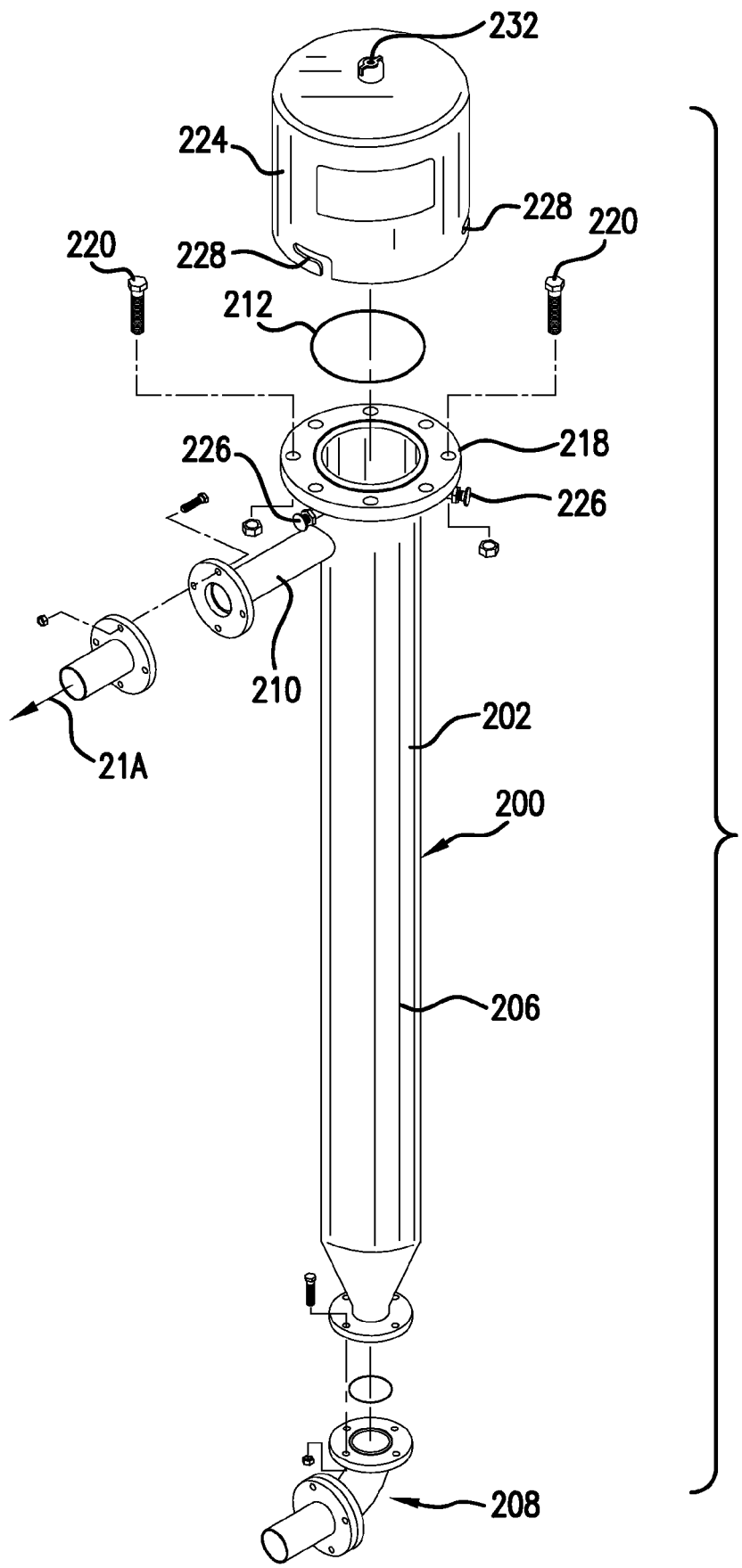
FIG. 13 is an exploded perspective view of a housing for a third embodiment of an electrochemical cell according to the present invention.
Figure 14:
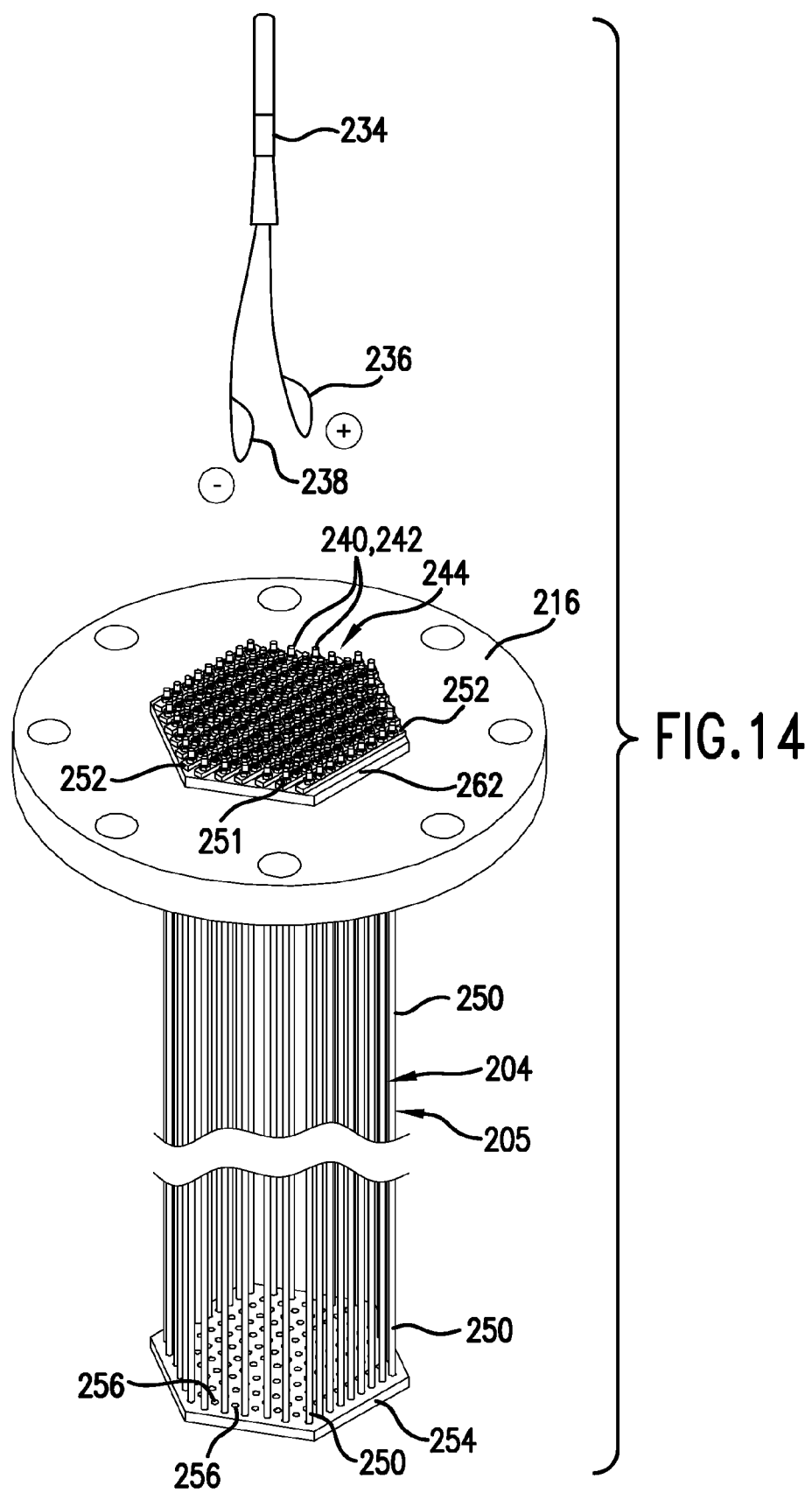
FIG. 14 is a perspective view of a replaceable cartridge inserted into the housing of the electrochemical treatment cell of FIG. 13 to form a completed electrochemical cell.

Referring now to FIGS. 13-19 there is shown a third embodiment, electrochemical module 200. Referring now specifically to FIGS. 13 and 14, FIG. 13 shows a circular housing 202, while FIG. 14 shows an array of electrodes 204 which are inserted into the housing 202 in order to complete each of the assembled electrochemical modules 200 shown in FIGS. 17-19.

The housing 202 of FIG. 13 is made of a dielectric material such as polyvinylchloride (PVC) or of Fiberglass and includes a barrel portion 206 that receives the electrode array 204 and inlet 208 that receives contaminated water 21 (see FIG. 1) that is to be treated by the electrode array 204. The water 21 treated within the barrel exits through an outlet 210 for further treatment by the clarification/filtration station 36 (see FIG. 1).

The completed module 200 is formed upon placing an O-ring seal 202; at the upper end 214 of the housing 202, sliding the electrode array 204 into the barrel 206; securing the flange 216 of the electrode array 204 to the flange 218 of the housing with bolts 220, and closing the assembly a cap 224. The cap 224 is removably held in place by set screws 226 that are received in L-shaped slots 228 in the cap 224. An opening 232 through to cap 224 receives a DC power line 234 (FIG. 14) that has a positive lead 236 and a negative lead 238. The positive and negative leads 236 and 238 are connected to terminals 240 and 242 in an array of terminals 244 which project from the flange 216 through a terminal isolator 246 that keeps the rods 250 forming the electrodes separate from one another. Nuts 251 are threaded on the ends of the electrodes 250 and are electrically isolated from a metal contact plate 262 by insulation 252 which may be in the form of insulating strips or an insulating plate. At the lower end of the electrode array 204, there is an electrode isolator 254 which keeps the distal ends of the electrodes 250 in spaced relation and electrically isolated. The second electrode isolator 254 includes a plurality of apertures 256 which permits the contaminated water 21 to flow readily between the individual rods forming the electrodes 250.

Figure 15:
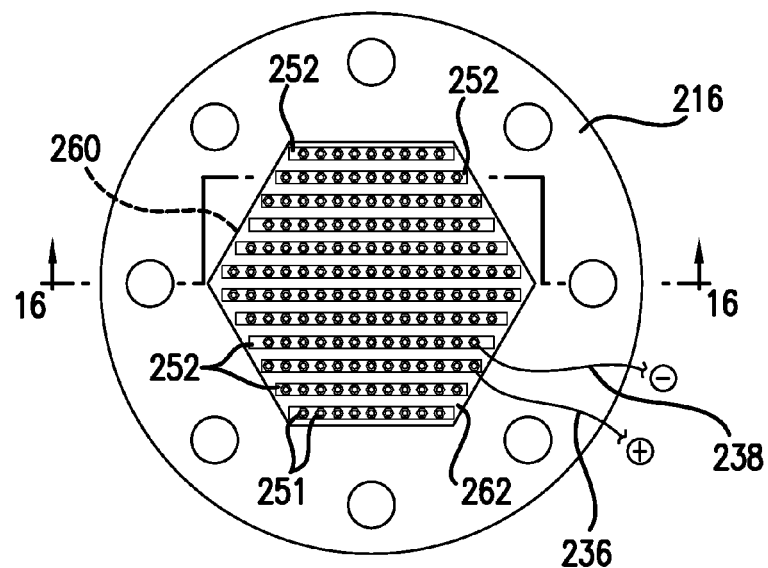
FIG. 15 is a top view of a connector used to connect positive and negative leads to electrodes within the replacement cartridge of FIG. 14.
Figure 16:
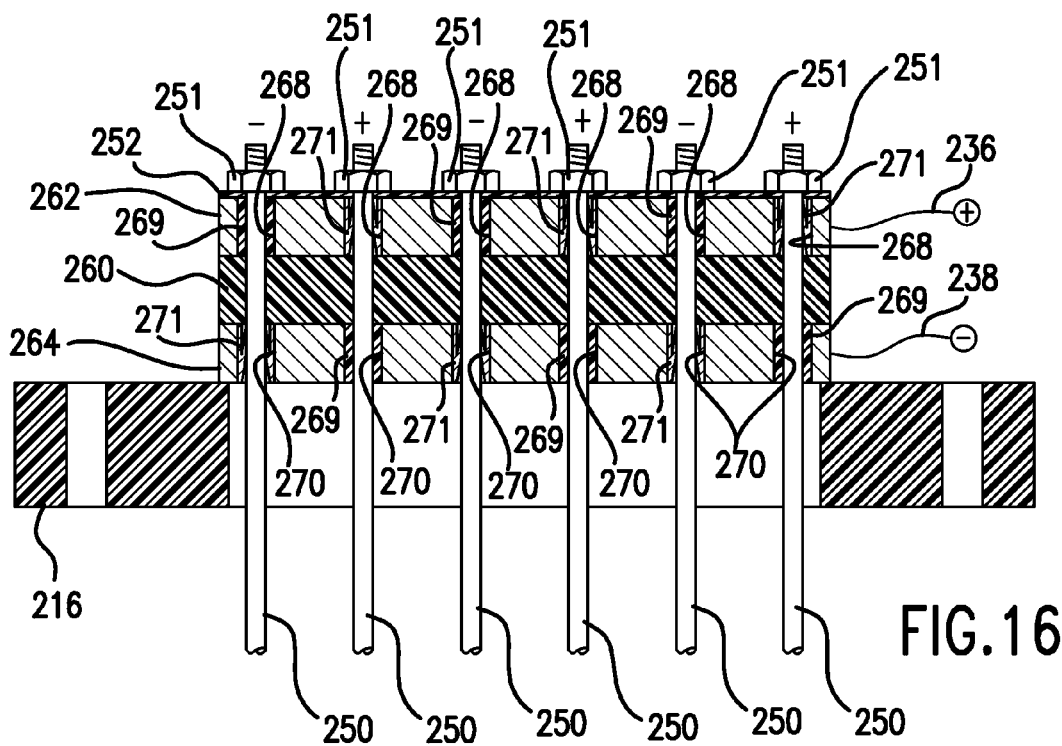
FIG. 16 is an elevational view, taken along lines 16-16 of FIG. 15, showing positive and negative leads attached to electrically isolated connector portions.

Referring now to FIGS. 15 and 16, there is shown an electrical connector 260 for connecting the leads 236 and 238 to the individual electrodes 250 in the electrode array 204, wherein each positive electrode is adjacent at least one negative electrode and each negative electrode is adjacent at least one positive electrode. This arrangement creates electrical fields between adjacent electrodes 250 that provide sufficient current density to cause coagulation of contaminants within the housing 202 and breaks chemical bonds of organic contaminants, such as those of TOCs (see Chart B.) As is seen in FIGS. 15 and 16, this is accomplished by sandwiching an insulator 260 between a pair of electrical contact plates 262 and 264 wherein the contact plate 262 is connected to the positive lead 236 and the contact plate 264 is connected to the negative lead 238. In the top contact plate 262 there are a plurality of holes 268 for receiving the electrical connectors 240 and 242 projecting from the electrodes 250 (see FIG. 14). Every other hole 268 has a sleeve 269 of insulating material with adjacent holes 268 having a spring type electrical contact 271 therein. Consequently, every other electrode 250 is connected to the positive lead 236 with the remaining electrodes 250 being isolated from the positive connector 236. The bottom contact plate 264 has holes 270 for receiving the projecting contacts 240 and 242. As with the contact plate 262, every other hole 270 has a spring contact 271 therein for engaging the rods 250 which are negatively polarized, while the remaining holes 270 have insulating material 269 therein so that negative polarity will not be applied. The two plates 262 and 264 have their insulated openings 268 and 270 out of alignment and their electrical contact openings out of alignment so that adjacent electrode 250 within the housing 202 have opposite polarities. Consequently, a plurality of electrical fields occur within the module 200 so as to precipitate solid contaminants out of the water 21 and so as to break the bonds of complex organic contaminants to and convert complex organic contaminants into carbon dioxide and water.

Figure 17:
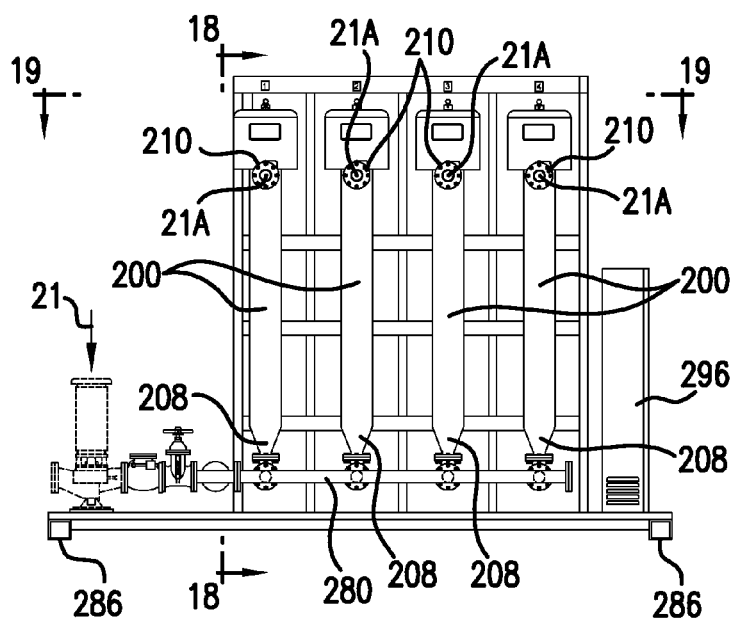
FIG. 17 is a front view of an electrochemical cell arrangements having a plurality of cells configured in accordance with the cell of FIGS. 13-16.
Figure 18:
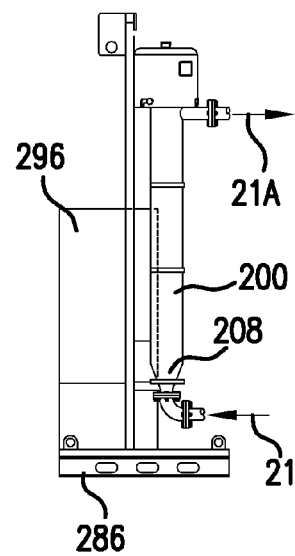
FIG. 18 is a top view of FIG. 17.
Figure 19:
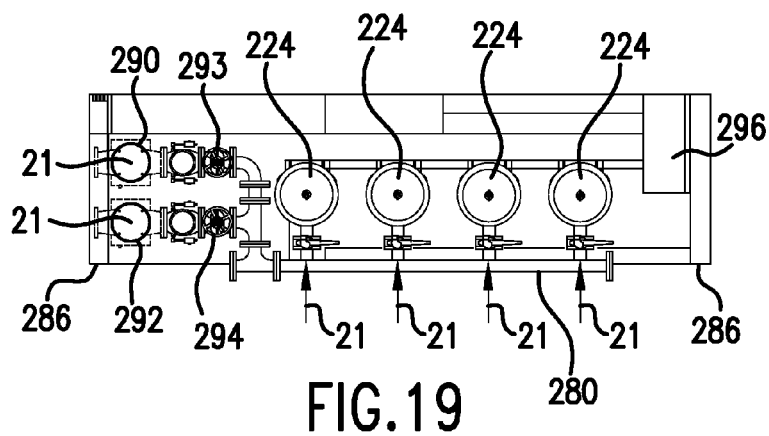
FIG. 19 is a side view of FIG. 17.

Referring now to FIGS. 17-19, in a commercial application, the electrochemical cells 200 are preferably mounted in a parallel array, wherein contaminated water 21 from a raw water source 22 or waste water source 23 (see FIG. 1) enters a manifold 280 and the intakes 208 of each of the electrochemical cells 200. The contaminated water 21 then rises through the electrode array 204, which separates contaminants therefrom, and exits through outlets 210 as treated water 21A. Thereafter the treated water 21A is processed by a treatment station 36 such as that seen in FIG. 1.

In a suggested commercial embodiment the electrochemical treatment modules 200 are mounted on a frame 285 that is supported by skids 2. Preferably, as seen in FIG. 19, contaminated inlet water 21 enters through a pair of inlets 290 and 292 controlled by inlet valves 293 and 294. The assembly of electrochemical treatment cells 200 includes a dedicated control system 296 that supplies DC power to the power lines 234 connected to each electrode array 204 (see FIGS. 14-16).

The preferred spacing between the electrodes 250 each of the electrode arrays 204 is about ¾ inch (1.905 cm) with the preferred electrodes being circular in cross section and having a diameter of about ¼ inch (2.54 cm). Each of the electrochemical treatment modules treats about 10 gallons per minute so that the bank treats about 40 gallons per minute. An installation in the field includes numerous banks of electrochemical treating units 200 so that 100 units will treat about four thousand gallons of water per minute or about five million gallons of water per day.

Batch Process

The aforedescribed electrode arrays 110 and 201 and arrays of any electrodes configured with electrode spacing effective to remove contaminants from aqueous solutions without clogging are suitable to practice this invention utilizing a batch process, wherein the array is dipped into a pool of water in a tank or container of any size and charged with DC current for a period of time suitable to remove contaminates without clogging. The electrode array can then be removed from the tank or container and the water drained or pumped to a separation or filter station, such as station 36, showing in FIG. 1 to remove the contaminates. Alternatively, the selected array of electrodes may remain in place in the tank or container and be rinsed by a portion of the water processed. The separation or filter station can be of any type effective for this purpose from a large municipal station to a simple filter. Thus, the invention described in this process has many applications from large sewage and industrial treatment plants to portable treatment devices used by individuals such as campers, boaters and military personnel.

Other variations of the above principles will be apparent to those who are knowledgeable in the field of the invention, and such variations are considered to be within the scope of the present invention. Other modifications and/or alterations may be used in the configuration and/or manufacture of the apparatus of the present invention, or in methods of practicing the present invention, without departing from the spirit and scope of the accompanying claims.

Moreover, the word "substantially" when used with an adjective or adverb is intended to enhance the scope of a particular characteristic.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding U.S. Provisional Application Ser. No. 61/075,842, filed Jun. 26, 2008, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

I claim:

1. A system for removing contaminants from raw water or waste water, the system including at least one electrochemical treatment module comprising:

a housing having an inlet for untreated water and an outlet for treated water that has been treated within the housing;

an array of electrodes comprising at least two positive and two negative electrodes within the housing, the electrodes having space there between of a selected distance, the space being greater than 0.5 inches (1.27 cm);

a source for applying direct current the electrodes to charge one portion of the array positively and another portion of the array negatively so as to create an electromotive force potential between oppositely charged electrodes, the direct current being sufficient to oxidize the contaminants and to neutralize small particle surface charges in an aqueous solution wherein the inlet for untreated water is below the outlet for treated water and wherein the electrodes extend transverse to the direction of water flow with the array of electrodes being configured of adjacent grids of alternating polarity, the grids having insulating material disposed there between wherein each grid is formed as a panel of spaced rods disposed between a pair of bus bars with each bus bar being connected to either a positive or negative bus and wherein the housing and panels of spaced rods are both rectangular with the outlet being disposed in a detachable portion of the housing to facilitate access to the grids, the positive bus and negative bus being on opposite sides of the housing to allow replacement of the grids in the housing after removal of the outlet portion of the housing.

2. The system of claim 1 further including a switch for reversing polarity at selected time intervals to minimize clogging tendencies in the space between electrodes.

3. The system of claim 2 further including a partial removal facility having an inlet connected to the outlet for gravitational or centrifugal removal and/or filtering of contaminant particulates from the treated water to remove the contaminant particulates and a venting arrangement for venting gas contaminant from the treated water, the partial removal facility having an outlet.

4. The system of claim 1 wherein there are a plurality of modules arranged in parallel to form at least one group of modules to increase the capacity of the system.

5. The system of claim 4 wherein there are a plurality of groups of modules to further increase the capacity of the system.

6. The system of claim 1 wherein each positively charged electrode is adjacent at least one negatively charged electrode and wherein each negatively charged electrode is adjacent at least one positively charged electrode.

7. The system of claim 2 wherein the electrodes are circular in cross section.

8. The system of claim 7 wherein the electrodes have a diameter in the range of ⅛ inch (0.317 cm) to 5/16 inch (0.794 cm).

9. The system of claim 1 wherein the array of electrodes is rectangular.

10. The system of claim 1 wherein the array of electrodes is polygonal.

11. The system of claim 1 wherein the panels extend vertically within the housing to form an electrochemical module.

12. The system of claim 1 wherein the electrochemical module is square in horizontal cross section and rectangular in vertical cross section with the inlet and outlet being aligned with a vertical axis.

13. The system of claim 12 wherein the electrochemical module is combined with other electrochemical modules to remove contaminants from water.

14. A device for removing contaminants from raw water or waste water, the device being an electrochemical treatment module comprising:
   a housing having an inlet for untreated water and an outlet for treated water that has been treated within the housing, the inlet being positioned below the outlet wherein the direction of water flow is upward toward the inlet during treatment;
   an array of electrodes comprising at least two positive and two negative electrodes within the housing, the electrodes having space there between of a selected distance, the space being greater than 0.5 inches (1.27 cm), the electrodes extending transverse to the direction of water flow and being arranged in adjacent grids of alternating polarity with insulating material disposed there between;
   a source for applying direct current to the electrodes to charge one portion of the array positively and another portion of the array negatively so as to create an electromotive force potential between oppositely charged electrodes, the direct current being sufficient to oxidize the contaminants and to neutralize small particle surface charges in an aqueous solution
   wherein the grids are formed as a panel of spaced rods with each panel being disposed between a pair of bus bars and with each bus bar being connected to either a positive or negative bus
   wherein the housing and panels are both rectangular with at least the outlet being disposed in a detachable portion of the housing to facilitate access to the panels, the positive bus and negative bus being on opposite sides of the housing to allow replacement of the panels in the housing after removal of the outlet portion of the housing.

15. The device of claim 14 wherein the panels extend vertically within the housing to form an electrochemical module.

16. The device of claim 14 wherein the electrochemical module is square in horizontal cross section and rectangular in vertical cross section with the inlet and outlet being aligned with a vertical axis.

17. The device of claim 16 wherein the electrochemical module is combined with other electrochemical modules to provide a system for removing contaminants from water.

18. The system of claim 8 wherein the electrodes have a diameter of ¼ inch (0.635 cm).

19. The system of claim 1 wherein the electrodes have a uniform shape in cross section.

20. The device of claim 14 wherein the electrodes have a uniform shape in cross section.

21. The device of claim 1 wherein the electrodes have a shape selected from a group consisting of cylindrical rods, perforated flat plates, unperforated flat plates, and undulating plates and rods.

22. The device of claim 14 wherein the electrodes have a shape selected from a group consisting of cylindrical rods, perforated flat plates, unperforated flat plates, and undulating plates and rods.

23. The device of claim 1 wherein the electrodes are positioned parallel to the raw water or waste water flow and wherein the raw water or waste water directly contacts the electrodes.

24. The device of claim 1 wherein the raw water or wastewater enters a manifold and the intake of the housing positioned at the base of said housing, said raw water or wastewater flows vertically in an upward direction within a portion of the housing containing the electrodes and wherein treated water exits through outlets positioned at the top of the housing.

25. The device of claim 1 wherein said housing also comprises a vent for the release of fluid gases released during the reaction process.

* * * * *

UNITED STATES PATENT AND TRADEMARK OFFICE
CERTIFICATE OF CORRECTION

PATENT NO. : 8,460,520 B2  Page 1 of 1
APPLICATION NO. : 12/492367
DATED : June 11, 2013
INVENTOR(S) : David Rigby It is certified that error appears in the above-identified patent and that said Letters Patent is hereby corrected as shown below:

In the Claims:

Column 18, line 22, reads "current the", should read --current to the--.

Signed and Sealed this
First Day of October, 2013

Teresa Stanek Rea
*Deputy Director of the United States Patent and Trademark Office*